US012546117B2

(12) United States Patent
Wiebe

(10) Patent No.: US 12,546,117 B2
(45) **Date of Patent: *Feb. 10, 2026**

(54) HAND RAIL SYSTEM AND ASSOCIATED COMPONENTS AND METHODS

(71) Applicant: Charles Wiebe, St. Louis, MO (US)

(72) Inventor: Charles Wiebe, St. Louis, MO (US)

( * ) Notice: Subject to any disclaimer, the term of this patent is extended or adjusted under 35 U.S.C. 154(b) by 769 days.

This patent is subject to a terminal disclaimer.

(21) Appl. No.: 17/814,568

(22) Filed: Jul. 25, 2022

(65) Prior Publication Data

US 2022/0356713 A1 Nov. 10, 2022

Related U.S. Application Data

(63) Continuation of application No. 16/586,315, filed on Sep. 27, 2019, now Pat. No. 11,396,756.

(60) Provisional application No. 62/838,870, filed on Apr. 25, 2019, provisional application No. 62/830,074, filed on Apr. 5, 2019, provisional application No. 62/738,443, filed on Sep. 28, 2018.

(51) Int. Cl.
*B27M 3/08* (2006.01)
*E04F 11/18* (2006.01)

(52) U.S. Cl.
CPC .......... *E04F 11/1814* (2013.01); *B27M 3/08* (2013.01); *E04F 11/1836* (2013.01); *E04F 2011/1887* (2013.01)

(58) Field of Classification Search
CPC ..... E04F 2011/1887; B27M 3/08; B27M 3/12
See application file for complete search history.

(56) References Cited

U.S. PATENT DOCUMENTS

| | | | |
|---|---|---|---|
| 1,409,155 | A | 3/1922 | Covan |
| 2,051,256 | A | 8/1936 | Hilke |
| 2,664,926 | A | 1/1954 | Fuglie |
| 2,720,899 | A | 10/1955 | Miller |
| 2,974,692 | A | 3/1961 | Bolenbach |
| 3,125,138 | A | 3/1964 | Bolenbach |
| 3,289,662 | A | 12/1966 | Garrison |
| 3,433,366 | A | 3/1969 | Brazell et al. |

(Continued)

OTHER PUBLICATIONS

Hearth.com, Wood Stacking Kriss-Cross, Jun. 15, 2009, www.hearth.com/talk/threads/wood-stacking-kriss-cross.35101/ (Year: 2009), best available copy, 13 pages.

*Primary Examiner* — Matthew Katcoff
(74) *Attorney, Agent, or Firm* — Stinson LLP

(57) ABSTRACT

A hand rail system and associated methods. Newel posts of the hand rail system can be mounted in a top mount configuration or a lateral mount configuration. Mounts are receivable in a boot subassembly in a horizontal or vertical arrangement for anchoring the boot subassembly to substructure. After anchoring of the boot subassembly, a column subassembly may be installed and anchored. Openings in the boot and column subassemblies permit access to the interior of the newel post for anchoring the boot and column subassemblies and for connecting a hand rail to the column subassembly. Subsequent installation of covers on the boot subassembly and column subassembly closes the newel post and provides a finished appearance free of external indication that openings in the newel post existed and have been covered. Four-sided turned newels, newel panel retainers, and associated methods are also disclosed.

20 Claims, 33 Drawing Sheets

(56) References Cited

U.S. PATENT DOCUMENTS

| | | | |
|---|---|---|---|
| 3,538,963 | A | 11/1970 | Adams |
| 3,578,043 | A | 5/1971 | Menge |
| 3,999,353 | A | 12/1976 | Dielman |
| 4,111,247 | A | 9/1978 | Hasenwinkle |
| 4,117,755 | A | 10/1978 | Hasenwinkle et al. |
| 4,239,069 | A | 12/1980 | Zimmerman |
| 4,262,717 | A | 4/1981 | Kohn |
| 4,277,998 | A | 7/1981 | Mayo |
| 4,722,374 | A | 2/1988 | Bond |
| 4,854,549 | A | 8/1989 | Roberts et al. |
| 4,869,302 | A | 9/1989 | Robson |
| 5,095,668 | A | 3/1992 | O'Brien et al. |
| 5,566,926 | A | 10/1996 | Voigt |
| 5,568,756 | A | 10/1996 | Peterson |
| 5,943,239 | A | 8/1999 | Shamblin et al. |
| 6,015,138 | A | 1/2000 | Kohlberger et al. |
| 6,286,571 | B1 | 9/2001 | Wiklund |
| 6,290,212 | B1 | 9/2001 | Bartel |
| 6,907,707 | B2 | 6/2005 | Deiter |
| 6,923,101 | B2 | 8/2005 | Culpepper et al. |
| 7,104,742 | B1 | 9/2006 | Fitts, III |
| 7,331,267 | B2 | 2/2008 | Urmson |
| 7,444,912 | B2 | 11/2008 | Fenton et al. |
| 7,530,298 | B2 | 5/2009 | Peterson |
| 8,973,314 | B1 | 3/2015 | Kurtz |
| D735,362 | S | 7/2015 | Kurtz |
| 9,102,074 | B2 | 8/2015 | Dale |
| 9,782,911 | B1 | 10/2017 | Garrett et al. |
| 10,480,190 | B2 | 11/2019 | Hirmke |
| 10,589,441 | B2 | 3/2020 | Hirmke |
| 10,603,810 | B2 * | 3/2020 | Rodriguez ............... B27M 3/08 |
| 2002/0157343 | A1 | 10/2002 | Bartel |
| 2009/0025336 | A1 | 1/2009 | Prenn |
| 2011/0253261 | A1 | 10/2011 | McGehee |
| 2012/0037276 | A1 | 2/2012 | Granberg et al. |
| 2015/0014618 | A1 | 1/2015 | Bull |
| 2016/0176068 | A1 | 6/2016 | Myers et al. |
| 2017/0328070 | A1 | 11/2017 | Lane |
| 2019/0203494 | A1 | 7/2019 | West |
| 2020/0277793 | A1 | 9/2020 | Calderone et al. |

* cited by examiner

HAND RAIL SYSTEM AND ASSOCIATED COMPONENTS AND METHODS

CROSS-REFERENCE TO RELATED APPLICATIONS

This application is a continuation of U.S. patent application Ser. No. 16/586,315, filed Sep. 27, 2019, and claims priority to U.S. Provisional Patent Application Nos. 62/838,870, filed Apr. 25, 2019, 62/830,074, filed Apr. 5, 2019, and 62/738,443, filed Sep. 28, 2018, each of which is hereby incorporated by reference in its entirety.

FIELD

The present disclosure generally relates to hand rail systems and associated components and methods, and more particularly to newel posts, components thereof, hand rail connections, and associated methods.

BACKGROUND

Hand rail systems are commonly installed along elevated structures (e.g., stairways, balconies, etc.) to provide a hand rail for use by a person navigating the structure. Newel posts are commonly used at a head of a stairway, at a foot of a stairway, at intermediate locations along a stairway, and/or at other locations along other types of elevated structures (e.g., spaced along balconies), to provide a primary support for hand rail sections. Some newel posts are constructed as generally box-like columns and are known as "box newels." Box newels are commonly fully constructed off site at a manufacturing facility. After delivery of the fully constructed box newels to the location of installation, the installer usually needs to modify the box newels in some way for the particular installation. For example, the installer usually needs to drill into the box newel to create several bores for passing fasteners through the box newel to anchor the box newel in place. The holes drilled in the box newel are covered with putty and detract from the overall appearance of the box newel. Moreover, the box newels can be relatively heavy, cumbersome, and challenging to install.

SUMMARY

In one aspect, a newel post boot subassembly is for supporting a newel post column for supporting a hand rail. The newel post boot subassembly comprises a rear wall having an inner face, an outer face, a top end, a bottom end, and opposite left and right mitred sides. The newel post boot subassembly includes a left wall having an inner face, an outer face, a top nd, a bottom end, and opposite rear and front mitred sides. A right wall has an inner face, an outer face, a top end, a bottom end, and opposite rear and front mitred sides. The left and right mitred sides of the rear wall are secured to the respective rear mitred sides of the left and right walls. The left and right walls extend forward from the rear wall. The inner faces of the left and right walls face each other. The newel post boot subassembly has a front opening extending from the front mitred side of the left wall to the front mitred side of the right wall. A column support shoulder is on the inner face of at least one of the rear, left, and right walls. The column support shoulder faces upward and is configured to support a newel post column for forming a newel post with the newel post boot. A pair of web mount engagement shoulders include a first mount engagement shoulder on the inner face of the left wall and a second mount engagement shoulder on the inner face of the right wall. The mount engagement shoulders are configured to support sides of a mount extending between the inner faces of the left and right walls.

In another aspect, a newel post column subassembly is for a newel post for supporting a hand rail. The newel post column subassembly includes a rear wall having an inner face, an outer face, a top end, a bottom end, and opposite left and right mitred sides. A left wall has an inner face, an outer face, a top end, a bottom end, and opposite rear and front mitred sides. A right wall has an inner face, an outer face, a top end, a bottom end, and opposite rear and front mitred sides. The left and right mitred sides of the rear wall are secured to the respective mitred rear sides of the left and right walls. The left and right walls extend forward from the rear wall. The inner faces of the left and right walls face each other. The newel post column subassembly has a front opening extending from the mitred front side of the left wall to the mitred front side of the right wall. A pair of mount engagement shoulders include a first mount engagement shoulder on the inner face of the left wall and a second mount engagement shoulder on the inner face of the right wall. The mount engagement shoulders face upward and are configured to support opposite sides of a mount extending between the inner faces of the left and right walls.

In another aspect, a connection of a hand rail to a newel post comprises a newel post and a hand rail section. The newel post includes an upper end portion having an opening therein extending from an interior surface of the upper end portion to an exterior surface of the upper end portion. The hand rail section has an end abutting the exterior surface of the upper end portion. A fastener has a shank including a threaded portion received in the end of the hand rail section. The shank extends away from the end of the hand rail to a head of the fastener. The shank has a longitudinal axis extending from a tip of the shank to an end of the shank connected to the head. The shank has a shank width extending transverse to the longitudinal axis of the shank adjacent the head. The head having a maximum width extending transverse to the longitudinal axis of the shank. The opening has a minimum width extending transverse to the longitudinal axis of the shank. The minimum width of the opening is greater than the maximum width of the head. A washer between the head of the fastener and the inside surface of the upper end portion has an aperture through which the shank of the fastener extends. The washer has a lateral slot extending from the aperture out a side of the washer. The slot extends away from the aperture in a direction transverse to the longitudinal axis of the shank. The slot defines a gap between portions of the washer bounding the slot. The gap has a width extending between the portions of the washer greater than the width of the shank.

Other aspects and features of the present disclosure will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
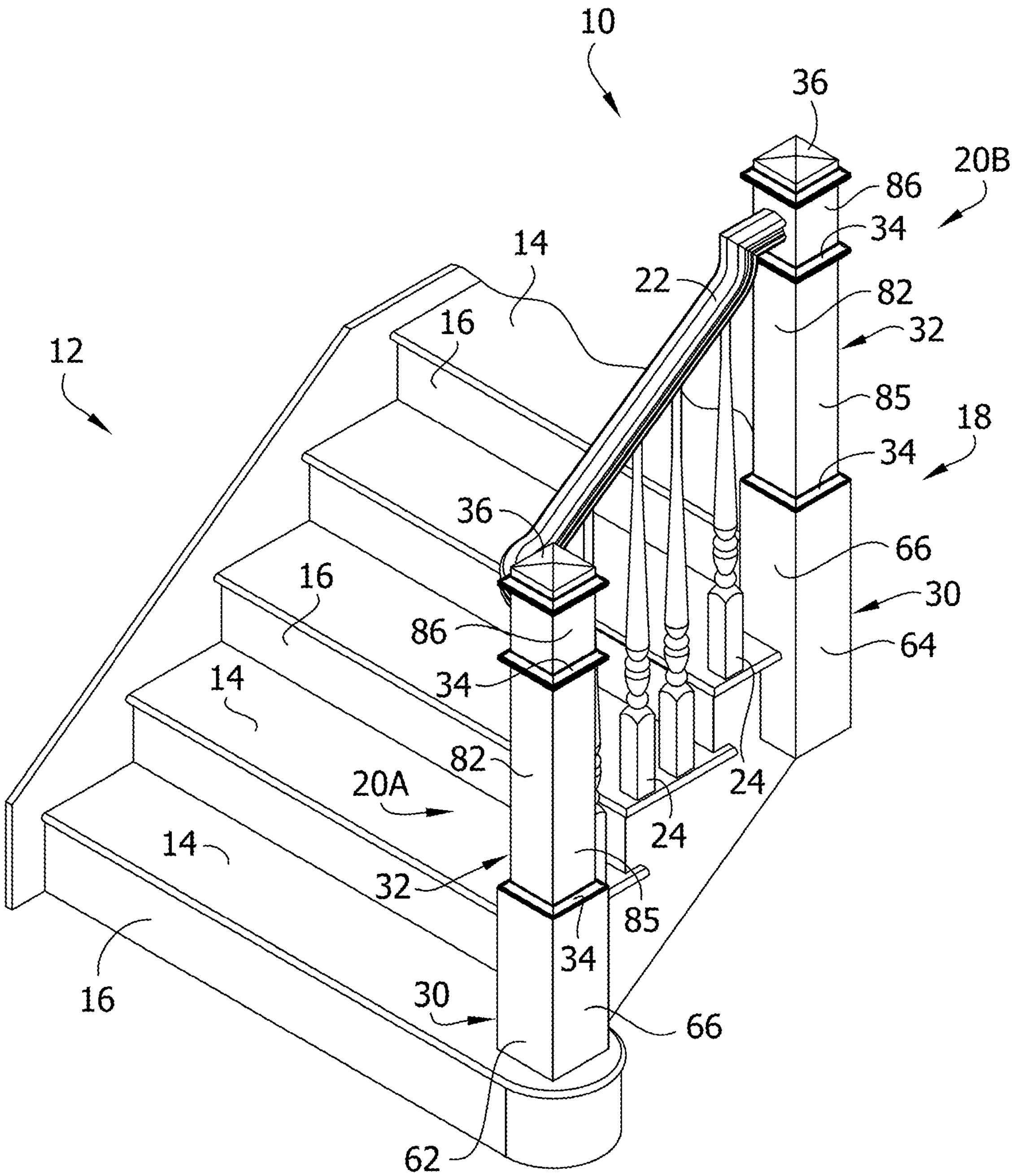
FIG. 1 is a perspective of a staircase including a hand railing system having a lower newel post and an upper newel post.

Referring to FIG. 1, a staircase embodying aspects of the present invention is designated generally by the reference number 10. The staircase (broadly, "elevated structure") includes a stairway 12 having a plurality of stairs each including a tread 14 and a riser 16. The bottom starting step is wider than the upper steps. The illustrated stairway ends at an upper landing tread 14. The staircase 10 includes a hand rail system 18 mounted on the stairway 12 to provide support and protection to persons walking up or down the stairway. It will be appreciated that the stairway 12 is shown by example without limitation. The hand rail system 18 of the present disclosure can be used with a variety of elevated structures (e.g., other types of stairways, balconies, etc.) without departing from the scope of the present invention.

The hand rail system 18 includes a lower newel post 20A, an upper newel post 20B, a hand rail 22, and a plurality of balusters 24. The newel posts 20A, 20B serve as primary support for the hand rail 22. In the illustrated embodiment, the lower newel post 20A is a "top mount" newel post on the starting step, and the upper newel post 20B is a "lateral mount" newel post primarily on the top step or landing tread 12. The hand rail 22 extends from the lower newel post 20A to the upper newel post 20B. The ends of the hand rail 22 are connected to the respective newel posts 20A, 20B to support the hand rail. The hand rail 22 can be formed of one or more hand rail sections connected together and/or connected to the newel posts 20A, 20B. The illustrated hand rail 22 includes a turn section connected to the lower newel post 20A and includes a gooseneck section connected to the upper newel post 20B. The balusters 24 extend from the hand rail 22 down to treads 12 of the steps. It will be appreciated that hand rail systems having other configurations and/or other components can be used without departing from the scope of the present invention.

The illustrated newel posts 20A, 20B are box-type newel posts and can be referred to as box newel posts. The newel posts 20A, 20B can be formed primarily of wood, or another suitable material. Each newel post 20A, 20B includes a boot 30 and a column 32 (or body) extending upward from the boot. The boot 30 has a lower end for engaging the stairway 12 and an upper end from which the column 32 extends. The column 32 has a foot supported by the boot 30 and has a head to which the hand rail 22 is connected. Decorative trim 34 can be provided at the junction of the column 32 and the boot 30 and around a neck of the column under the column head. The head includes a decorative cap 36. It will be understood that the trim 34 and cap 36 are shown by way of example.

Figure 2:
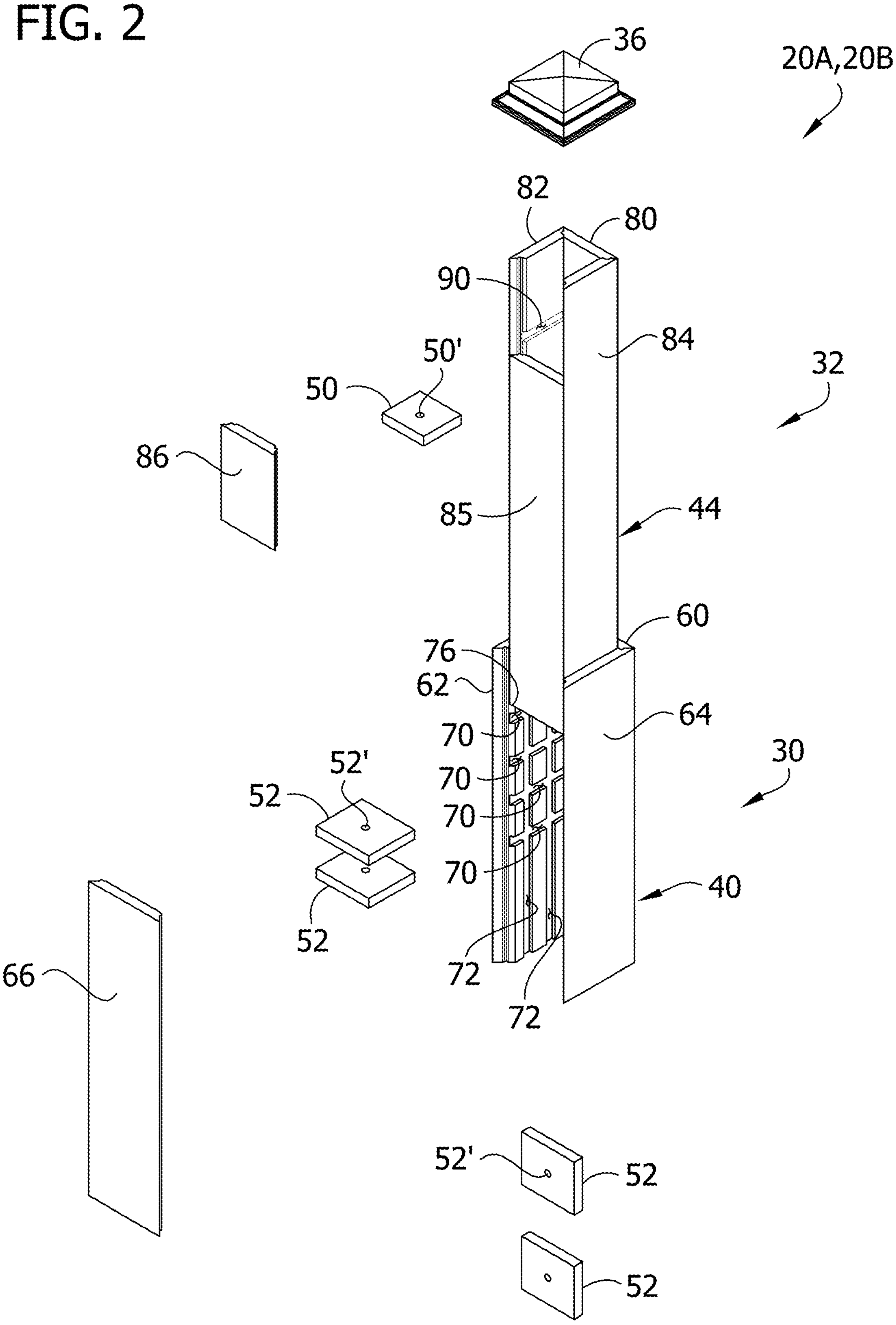
FIG. 2 is an exploded view of a newel post of the hand railing system.

A newel post 20A, 20B prior to installation is shown in an exploded configuration in FIG. 2. The newel post boot 30 includes a boot subassembly 40 and a front cover 42 for closing a front opening of the boot subassembly. The newel post column 32 includes a column subassembly 44 and a front cover 46 for closing a front opening of the column subassembly. The cap 36 is configured to close a top opening of the column subassembly 44. Column webs 50 and boot webs 52 (broadly, "mounts") are usable with the column and boot subassemblies, respectively, for anchoring the boot and/or column subassemblies, as will be explained in further detail below. The webs 50, 52 can be made of plywood or another suitable material and may include a central opening 50', 52' for passage of a rod 54, as explained below. The illustrated webs are longer than they are thick, but other constructions can be used without departing from the scope of the present invention. Desirably, prior to installation, the column subassembly 44 and boot subassembly 40 are not connected to each other such that they are easy to move and less cumbersome than if connected. Moreover, the column subassembly 44 being unconnected to the boot subassembly 40 prior to installation permits the installer to mount the column subassembly in various rotated orientations with respect to the boot subassembly.

The boot subassembly 40 includes a rear wall 60, a left wall 62, and a right wall 64. Each of the walls 60, 62, 64 has an inner face facing an interior of the boot and an outer face opposite the inner face. Each of the three walls 60, 62, 64 also has opposite top and bottom ends. The rear wall 60 has left and right sides connected to rear sides of the left and right walls 62, 64. The abutting wall sides can be attached to one another by glue or another suitable adhesive or by fasteners (e.g., nails). A front opening of the boot subassembly 40 extends from the front side of the left wall 62 to the front side of the right wall 64. As will become apparent, the front opening provides access to the interior of the boot subassembly 40 to facilitate installation of the newel post 20A, 20B. The boot 30 includes a front cover 66 sized and shaped to close the front opening when access to the inside of the boot subassembly 40 is no longer needed. The front cover 66 has an inner face that faces the interior of the boot 30 when the cover is installed and has an exterior face opposite the inner face. The front cover 66 has upper and lower ends giving the front cover a height the same or about the same as the heights of the rear, left, and right walls 60, 62, 64. The front cover 66 includes left and right sides that abut the front sides of the left and right walls 62, 64 when the front cover is installed. The cover 66 can be installed by adhering (e.g., gluing) or fastening (e.g., nailing) the sides of the cover to the front sides of the left and right walls 62, 64. The sides of the walls 60, 62, 64 and the cover 66 (i.e., the left and right sides of the rear wall, the front and rear sides of the left and right walls, and the left and right sides of the front cover) are all mitred in the illustrated embodiment. More specifically, the sides are formed to have corresponding lock mitres. The engagement of mitred sides of adjacent walls 60, 62, 64 of the boot subassembly 40 forms mitred joints at corners of the boot subassembly, and the engagement of the mitred sides of the front cover 66 with the mitred front sides of the left and right walls 62, 64 form mitred joints at corners of the boot 30. In manufacture, the rear wall 60 and cover 66 can be made as identical components, and the left and right walls 62, 64 can be made as identical components. Depending on the arrangement of the lock mitres, the three walls 60, 62, 64 and the front cover 66 can all be made as identical components.

The boot subassembly 40 includes interior features that facilitate anchoring of the boot 30 for installation and facilitate anchoring of the column 32. As seen in FIG. 2, the inside face of the left wall 62 includes a plurality of horizontal grooves 70 and vertical grooves 72. More specifically, four horizontal grooves 70 are provided and two vertical grooves 72 are provided. Each of these grooves 70, 72 defines a boot web receiver or mount receiver adapted for receiving one of the boot webs 52. One or more of the webs 52 can be inserted in various receivers 70 for different types of anchoring of the boot subassembly 40 to a substructure (e.g., one or more components of the stairway). Although not shown in FIG. 2, it will be appreciated that corresponding horizontal grooves 70 are provided on the inner face of the rear wall 60 and the inner face of the right wall 64 and form part of respective boot web receivers 70 with the grooves in the left wall 62. Moreover, corresponding vertical grooves 72 are provided on the inner face of the right wall 64 and form part of the respective boot web receivers 72 with the grooves in the left wall 62.

The horizontal grooves 70 can be used for a "top mount" installation and/or a "lateral mount" installation. The horizontal grooves 70 are bounded by respective upper and lower horizontal shoulders. The upper shoulder of a horizontal groove faces downward, and the lower shoulder of a horizontal groove faces upward. The arrangement is such that a boot web 52 can be slid into a selected set of grooves 70 from the front opening. The shoulders extend to the front opening for slidably receiving the webs 52. When a web 52 is received in a web receiver 70, edge margins of the web 52 rest on the upward facing shoulders, and upward movement of the web is limited by the downward facing shoulders. Depending on the type of installation, the web 52 may be pressed against the upward or downward facing shoulder for anchoring the boot 30 and/or column 32.

The vertical grooves 72 are usually used for a "lateral mount" installation. The vertical grooves 72 are bounded by respective forward and rearward shoulders. The forward shoulder of a vertical groove 72 faces rearward, and the rearward shoulder of a vertical groove faces forward. The arrangement is such that one or more boot webs 52 can be slid into a selected set of grooves 72 from a bottom opening of the boot subassembly 40. The shoulders extend to the bottom opening for slidably receiving the webs 52. When a web 52 is received in a web receiver 72, edge margins of the web 52 will usually press against the rearward facing shoulders when fasteners 74 are installed through the web into a substructure for anchoring the boot 30.

Another interior feature of the boot subassembly 40 is a column support structure 76 formed by horizontal shoulders on inside faces of the rear, left, and right walls 60, 62, 64. The shoulders 76 are provided at the same height on each of the rear, left, and right walls 60, 62, 64 for engagement with the foot of the column 32 when the column is positioned in the top opening of the boot 30. Usually, the boot subassembly 40 will be installed apart from the column subassembly 44, and then the column subassembly will be loosely installed on the boot subassembly by resting it on the horizontal column support shoulders 76, before the column subassembly is permanently anchored, which causes the foot of the column to press against the column support shoulders for a stable installation.

The column subassembly 44 includes a rear wall 80, a left wall 82, a right wall 84, and a front wall 85. Each of the walls 80, 82, 84, 85 has an inner face facing an interior of the column subassembly 44 and an outer face opposite the inner face. Each of the four walls 80, 82, 84, 85 also has opposite top and bottom ends. The rear wall 80 has left and right sides connected to rear sides of the left and right walls 82, 84. The front wall 85 has left and right sides connected to front sides of the left and right walls 82, 84. The abutting wall sides can be attached to one another by glue or another suitable adhesive or by fasteners (e.g., nails). An upper front opening of the column subassembly 44 is located above the front wall 85 and extends from the front side of the left wall 82 to the front side of the right wall 84. As will become apparent, the front opening provides access to the interior of the column subassembly 44 to facilitate installation of the newel post 20A, 20B. The column 32 includes a front cover 86 sized and shaped to close the front opening when access to the inside of the column subassembly 44 is no longer needed. The front cover 86 has an inner face that faces the interior of the column when the cover is installed and has an exterior face opposite the inner face. The combined height of the front wall 85 and the front cover 86 is about the same or the same as the heights of the rear, left, and right walls 80, 82, 84. The front cover 86 includes left and right sides that abut the front sides of the left and right walls 82, 84 when the front cover 86 is installed. The sides of the walls 80, 82,

84, 85 and the cover 86 are all mitred in the illustrated embodiment. More specifically, the sides are formed to have corresponding lock mitres. The engagement of mitred sides of adjacent walls 80, 82, 84, 85 of the column subassembly 44 forms mitred joints at corners of the column subassembly, and the engagement of the mitred sides of the front cover 86 with the mitred front sides of the left and right walls 82, 84 form mitred joints at corners of the column 32. In manufacture, the front and rear walls 80, 85 can be made as substantially identical components (except for the front wall being shorter), and the left and right walls 82, 84 can be made as identical components. Depending on the arrangement of the lock mitres, the four walls 80, 82, 84, 85 can all be made as identical components, and the front wall can be cut to separate the front cover 86 from the front wall.

The column subassembly 44 includes interior features that facilitate anchoring of the column 32 for installation. As seen in FIG. 2, the inside face of the left wall 82 includes a horizontal groove 90 accessible from the front opening. The groove 90 defines a boot web receiver or mount receiver adapted for receiving a column web 50. Although not shown in FIG. 2, it will be appreciated that corresponding horizontal grooves 90 are provided on the inner face of the rear wall 80 and the inner face of the right wall 80 and form part of the column web receiver with the groove 90 in the left wall 82. Although not shown in FIG. 2, a similar set of grooves 90 (FIG. 12) is provided at the foot of the column subassembly 44 for holding a lower column web 50. The lower column web 50 is seen best in FIGS. 4 and 9. The lower column web 50 is captured inside the column subassembly 44 during manufacture. The upper column web 50 may likewise be pre-installed and captured (e.g., grooves having closed fronts) or may not be installed in the column subassembly 44 until the column subassembly is installed at the job site.

The horizontal grooves 90 of the column walls 82, 84, 85 are bounded by respective upper and lower horizontal shoulders. The upper shoulder of a horizontal groove 90 faces downward, and the lower shoulder of a horizontal groove faces upward. The arrangement is such that the upper column web 50 can be slid into the upper set of grooves 90 from the front opening. The shoulders extend to the front opening for slidably receiving the web 50. Edge margins of the webs 50 rest on the upward facing shoulders, and upward movement of the webs is limited by the downward facing shoulders. When the column subassembly 44 is installed, the upper column web 50, and optionally the lower column web 50, will usually be pressed against the upward facing shoulders for anchoring the column.

The column subassembly 44 has a smaller width than the inside of the boot subassembly 40 such that the foot of the column 32 is receivable in the top opening of the boot 30. The width of the column 32 is greater than the width of the boot interior at the column support shoulders 76 such that the bottom of the column 32 rests on the boot support shoulders when the column is installed in the top opening of the boot 30.

Figure 8:
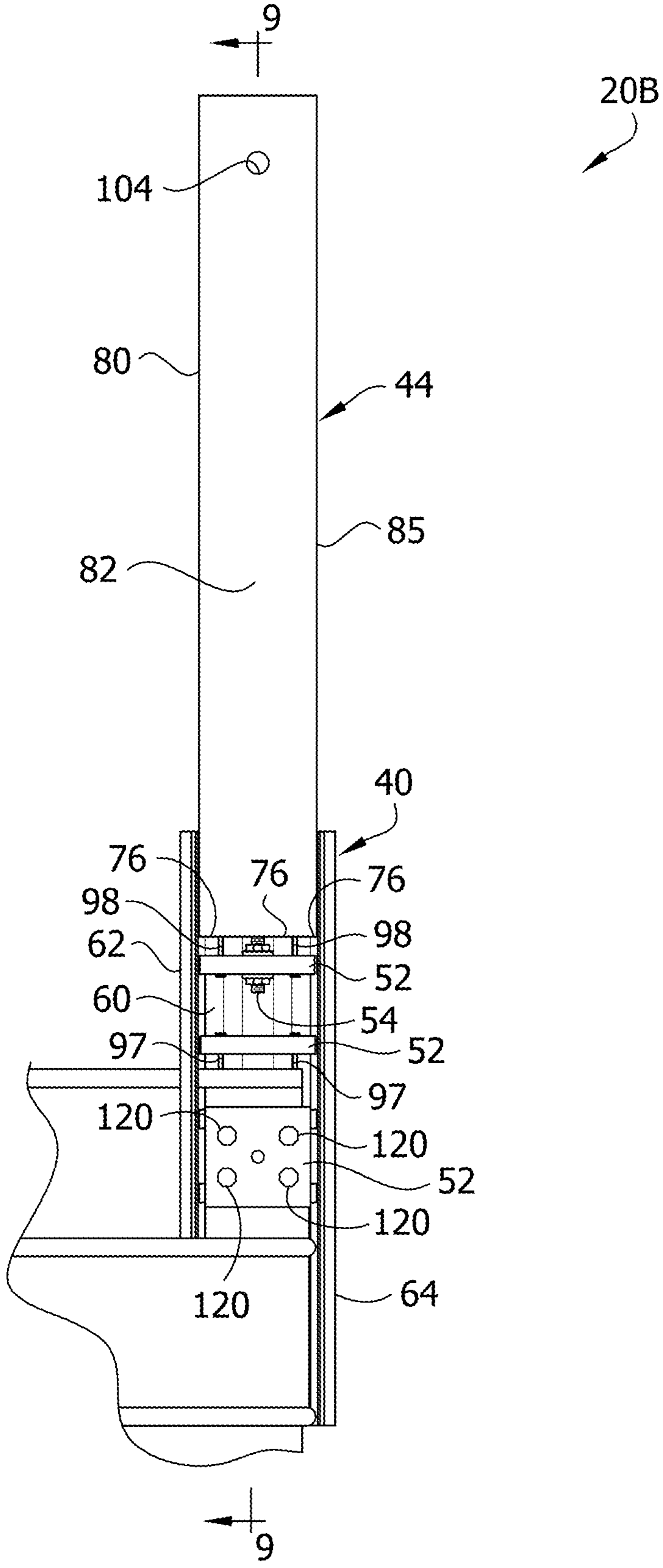
FIG. 8 is a front elevation of the upper newel post of FIG. 1 partially assembled.

It will be appreciated that the directions front, rear, left, and right as referenced herein are used for convenience and with respect to the orientation of the components as shown in FIG. 2. The directions can be different in the installed orientation. For example, as viewed in FIG. 1, the left wall 62 of the boot subassembly 40 of the lower newel post 20A faces forward, as does the left wall 82 of the column subassembly 44 of the lower newel post. On the other hand, as viewed in FIG. 1, the cover 66 of the boot 30 of the upper newel post 20B faces forward, and the left wall 82 of the column subassembly of the upper newel post 20B faces forward. Notably, for the lower newel post 20A, the outer faces of the covers 66, 86 of the boot 30 and column 32 face in the same direction (to the right in FIG. 1), whereas for the upper newel post 20B, the outer face of the cover 86 of the column 32 and the outer face of the cover 66 of the boot 30 face in different directions (to the right and forward, respectively, as viewed in FIG. 1). The column subassembly 44 of the upper newel post 20B is rotated 90 degrees with respect to the boot subassembly 40 of the upper newel post (as also seen in FIG. 8).

Figure 3:
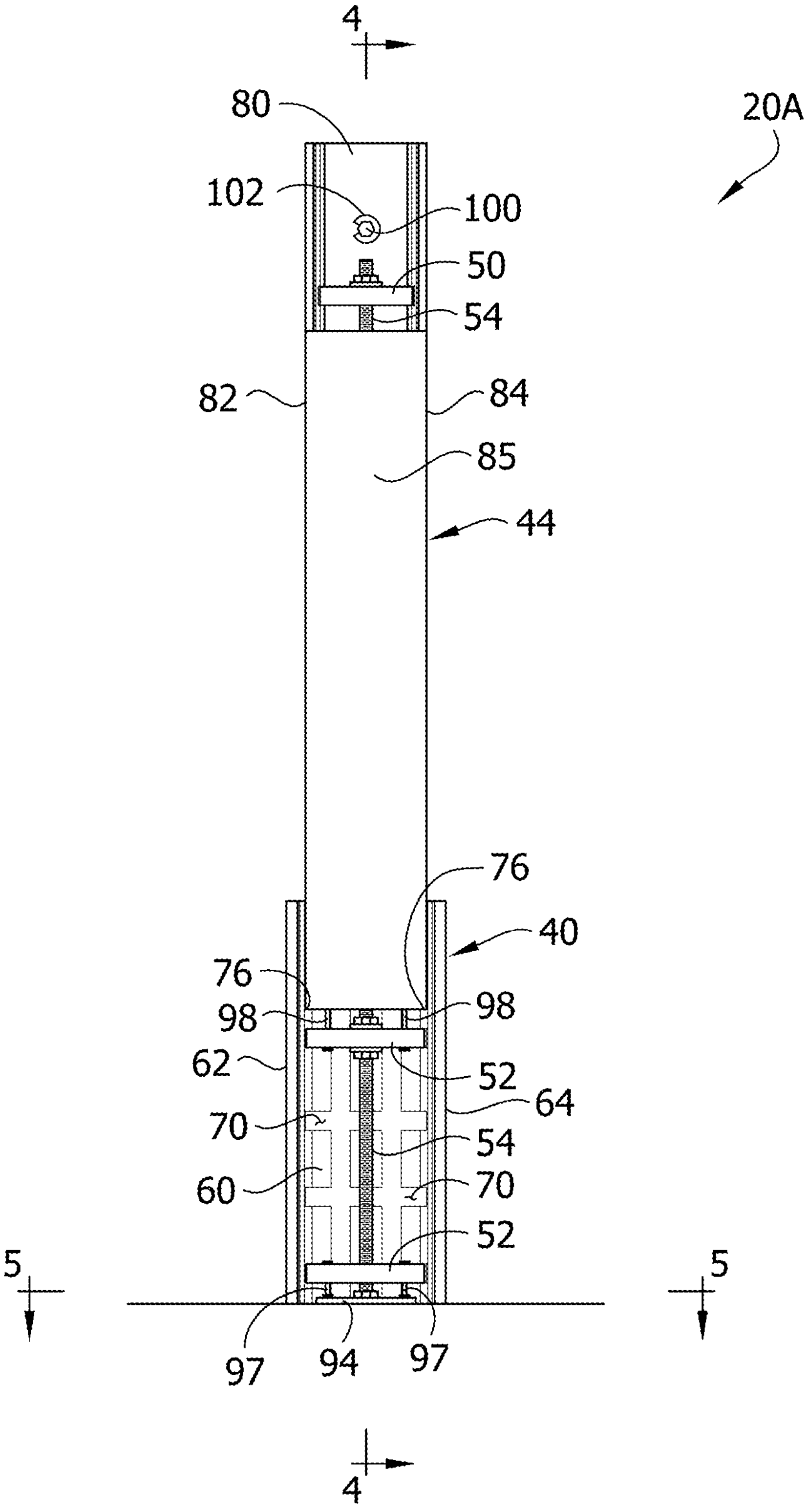
FIG. 3 is a right elevation of the lower newel post of FIG. 1 partially assembled.
Figure 4:
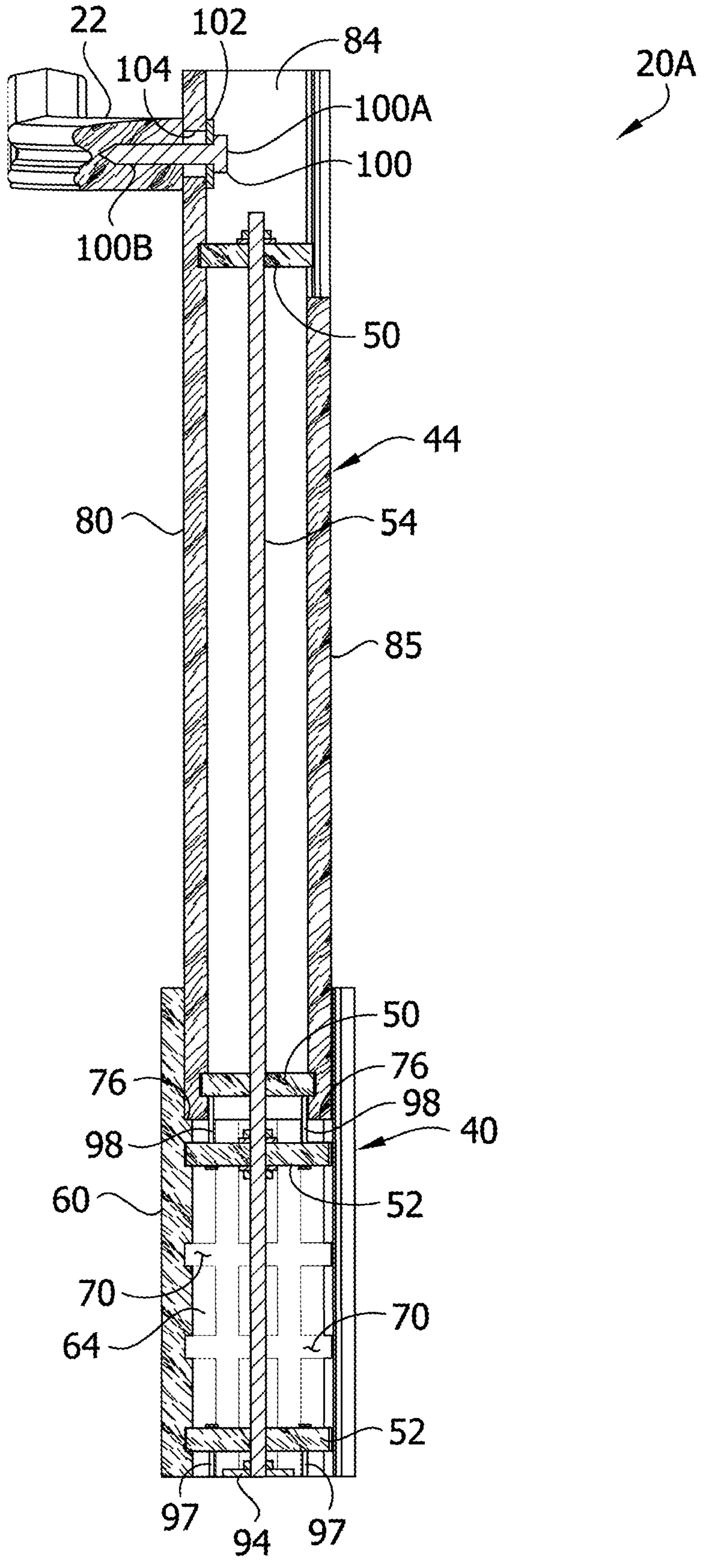
FIG. 4 is a section of the newel post taken in the plane including line 4-4 of FIG. 3.
Figure 5:
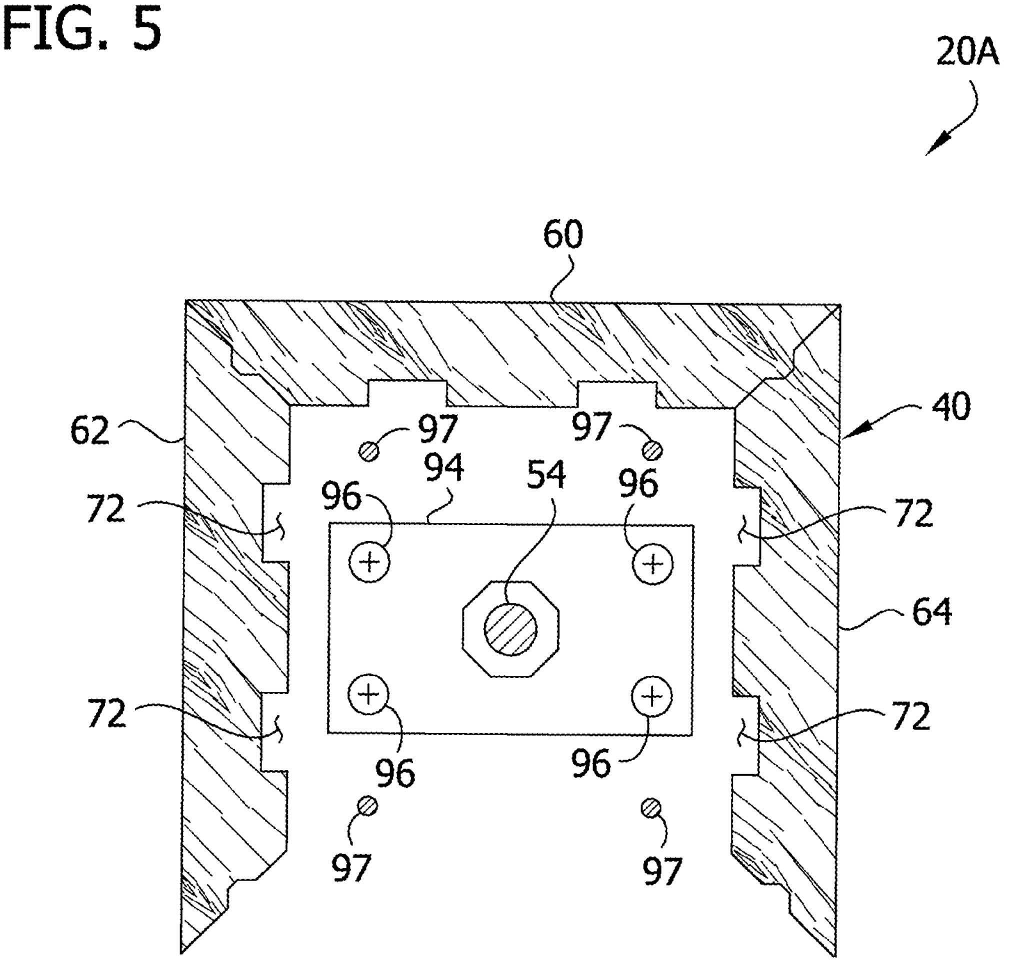
FIG. 5 is a section of the newel post taken in a plane including line 5-5 of FIG. 3.

Example installations of the newel post 20A, 20B will now be discussed. FIGS. 3-5 show a first option for "top mounting" the lower newel post 20A. In this installation, the front openings of both the boot and the column subassemblies 40, 44 face to the right. As explained above, the boot subassembly 40 is desirably disconnected from the column subassembly 44 to begin installation. The boot subassembly 40 is a relatively light weight component and can be easily manipulated to make a level mounting of the boot subassembly.

For the top mounting application, the boot subassembly 40 (and the front cover 66) will usually be cut to shorten the boot 30. For example, the boot subassembly 40 as shown in FIG. 3 has been cut to shorten the boot subassembly to about an inch below the lowest set of horizontal grooves 70. The horizontal grooves 70 can be arranged to correspond to different hand rail heights. For example, the lowest set of grooves 70 can correspond to a 42 inch rail height, the second lowest set of grooves 70 can correspond to a 39 inch rail height, and the third lowest set of grooves 70 can correspond to a 36 inch rail height. It will be appreciated these heights are given by way of example and can be different without departing from the scope of the present invention.

Figure 6:
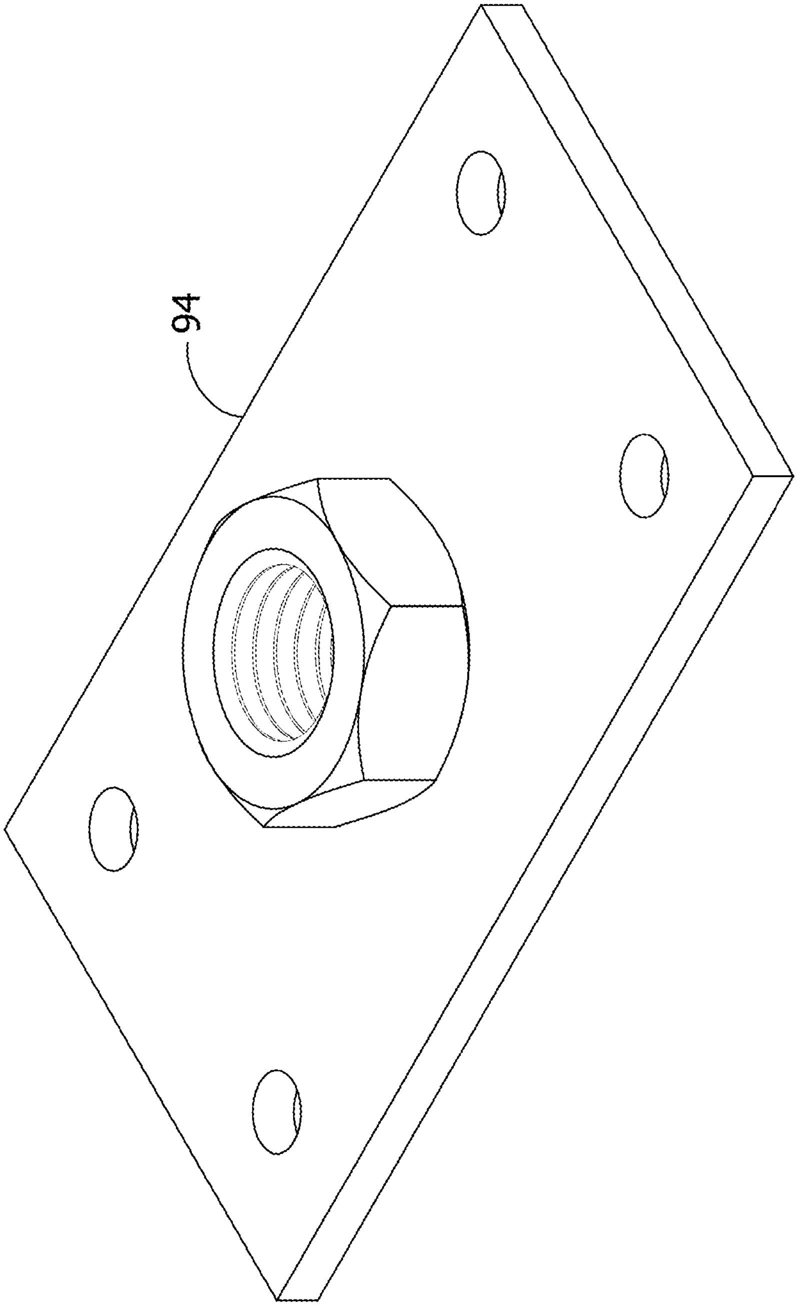
FIG. 6 is a perspective of a mounting bracket for a newel post.

A top mount installation such as used for the lower newel post 20A in the illustrated embodiment desirably uses a mounting bracket or anchor 94 such as shown in FIG. 6. The bracket 94 can include a plate (e.g., 3.5 inch by 2 inch metal plate) and a nut secured to the plate (e.g., by welding). As will become apparent, the mounting bracket 94 serves as an anchor for a rod 54 for anchoring the newel post 20A. The bracket 94 can be mounted by passing fasteners 96 (e.g., screws) through openings in the bracket into the tread 12 of the first step (or other suitable substructure). The boot subassembly 40 is centered over the nut of the mounting bracket 94. The arrangement is such that a threaded rod 54 (broadly, "fastener") having a first end threaded into the mounting bracket 94 extends upward through aligned openings 52' in two boot webs 52. A first boot web 52 is received in the lowest set of grooves 70 and a second boot web 52 is received in the highest set of grooves 70. Nuts and washers can be used on upper and/or lower sides of the boot webs 52. In the illustrated embodiment, nuts and washers are provided on the upper and lower sides of the upper boot web 52. The upper nut can be threaded down to put the threaded rod 54 in tension and press the bottom of the boot 30 against the substructure for anchoring the boot. In the illustrated embodiment, the threaded rod 54 passes through the lower boot web 52 but is not connected to the lower boot web by a nut. The lower boot web 52 can be anchored to the substructure by fasteners 97 (e.g., screws) extending across the gap between the lower surface of the web and the substructure. The fasteners 97 provide anchoring of the boot subassembly 40 to the substructure in addition to the tensioned threaded rod 54.

The threaded rod 54 extends from the boot subassembly 40 upward into the column subassembly 44. The threaded rod 54 passes through an opening 50' in the lower column web 50 and an opening in the upper column web 50. A nut (broadly, "fastener") and washer on the upper end of the rod 54 are threaded down on the rod to press the upper column web 50 against lower shoulders of the upper column web receiver 90 and thus tension the rod 54 and press the foot of the column subassembly 44 against the column support shoulders 76 of the boot subassembly 40. It will be appreciated that the front openings of the boot subassembly 40 and the column subassembly 44 permit convenient access to the interior of the boot and column subassemblies for installation of the rod 54 and turning of the nuts to anchor the boot and column subassemblies. The boot subassembly 40 and threaded rod 54 can be installed and followed by installation of the column subassembly 44. The column subassembly 44 will usually be plumb because it is resting on a boot subassembly 40 that has been installed plumb. However, if needed, fasteners 98 (e.g., screws) can be passed from the upper boot web 52 into the lower column web 50 and tightened as needed to plumb the column subassembly 44.

As shown in FIGS. 3 and 4, an end of the hand rail 22 is connected to the upper end of the column subassembly 44 by a bolt 100 and an open sided washer 102. When the installer is installing the column subassembly 44, the installer can drill a hole 104 in one or more sides of the head of the column subassembly, depending on the number of hand rail sections 22 to be connected to the newel post 20A. In the illustrated embodiment, only one opening 104 needed. The opening 104 has a width greater than a width of the head 100A of the bolt 100. The arrangement is such that a threaded shank 100B of the bolt 100 can be installed in the end of the hand rail section 22 and then the head 100A of the bolt can be passed through the opening 104 in the column subassembly 44 into the interior of the column subassembly. Thereafter the open sided washer 102 can be installed by moving the washer laterally onto the shank 100B of the bolt 100. The front opening and the open top of the column subassembly 44 permit the installer to easily access the head 100A of the bolt 100 with a wrench or other tool to turn the bolt to thread it further into the hand rail section 22, thus pressing the head of the bolt against the washer 102, pressing the washer against the inner face of the column wall 80, and pressing the end of the rail section 22 against the outer face of the column wall 80.

After the boot and column subassemblies 40, 44 have been anchored, and the necessary railing sections 22 have been connected to the head of the column subassembly, the front covers 46, 86 and the cap 36 can be installed on the respective boot and column subassemblies for closing the boot 30 and column 32. It will be appreciated that installing the boot 30 and column 32 partially assembled as the subassemblies 40, 44 provides the advantage of easy access to the interior of the newel post 20A for anchoring the boot and column. When the covers 46, 86 and top cap 36 are installed, the newel post 20A has a finished appearance without any plugs in the side walls 40, 42, 44, 80, 82, 84, 86 or covers 46, 86. The covers 46, 86 are made to blend with the boot and column subassemblies 40, 44 such that after installation, an observer of the newel post 20A would not know that the post was open while being installed and then closed with the covers. The seam at the junction of the lower end of the column cover 86 and the upper end of the front wall 85 of the column subassembly 44 can be covered by the trim 34 at the neck of the column 32. Thus, no exterior visual clues remain after installation that the newel post 20A was partially open during installation and was closed with covers. This is particularly desirable in installations where the newel post 20A is not painted but stained and would show plugs or putty applied to holes in the walls of the newel post.

Figure 7:
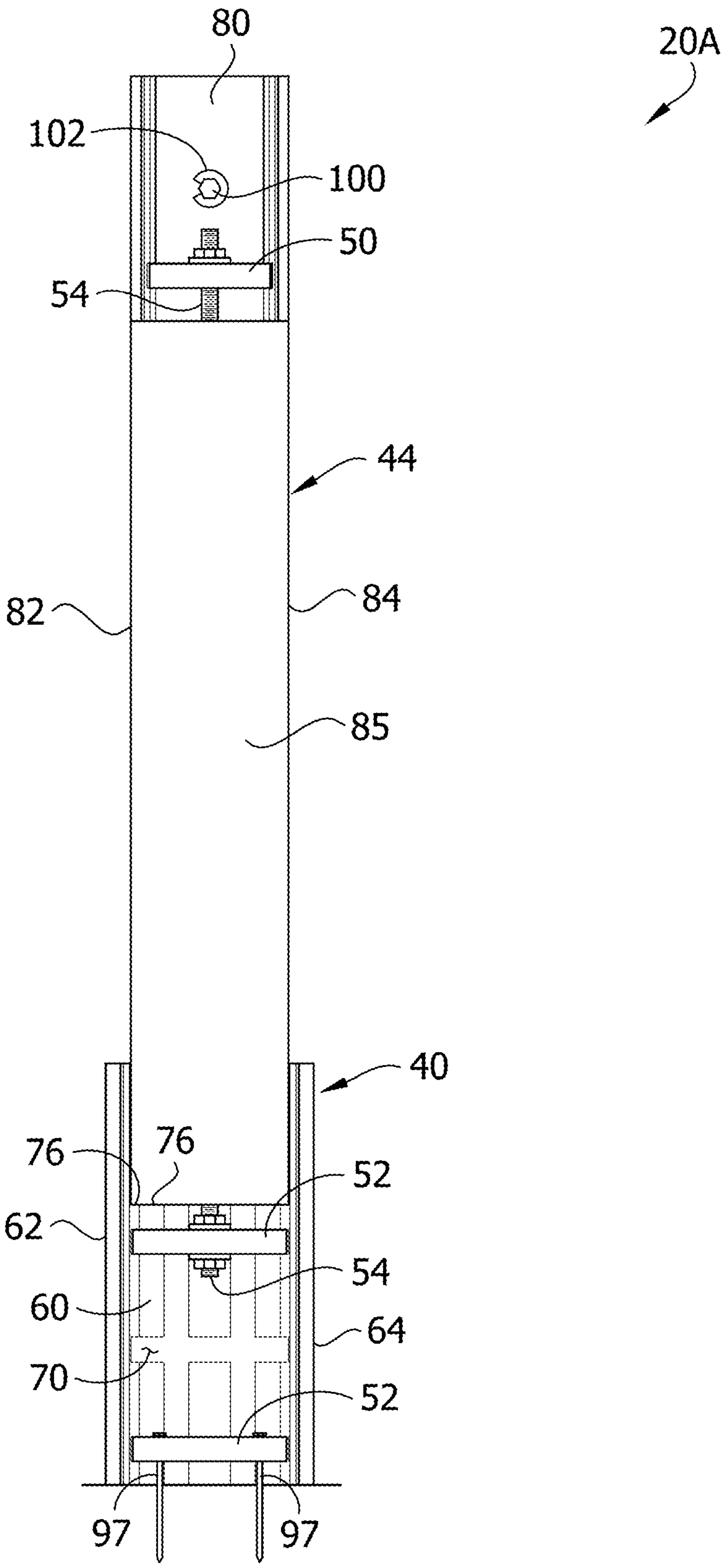
FIG. 7 is a side elevation of the lower newel post of FIG. 1 partially assembled and having an alternative mounting configuration.

FIG. 7 shows an alternative configuration for "top mounting" the lower newel post 20A. In this alternative, the mounting bracket 94 is not used. The lower boot web 52 and thus the boot subassembly 40 is anchored to the substructure by fasteners 97 (e.g., screws) passing through the lower boot web into the substructure. The lower surface of the boot web 52 is spaced from the substructure and is drawn toward the substructure by the fasteners 97 to press the bottom of the boot subassembly 40 against the substructure. The lower end of the rod 54 is mounted to the upper boot web 52 by nuts and associated washers on upper and lower surfaces of the upper boot web. The nut above the upper column web 50 is threaded down on the rod 54 to tension the threaded rod and cause the column foot to press against the boot support shoulders 76 of the boot subassembly 40. It will be appreciated that the newel post 20A could have a shorter height by cutting the boot 30 to a shorter length such that a higher set of horizontal grooves 70 could be used for the lower boot web 52.

Figure 9:
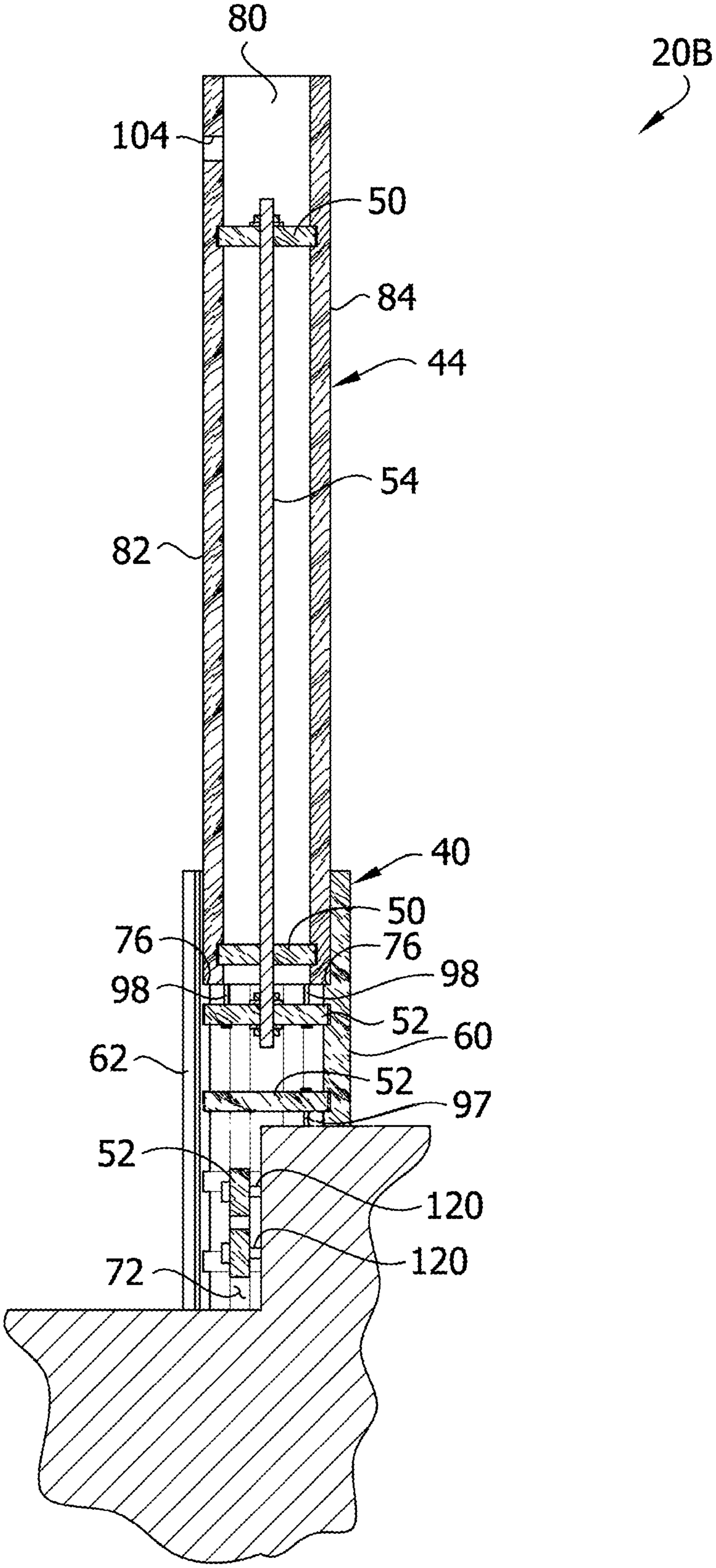
FIG. 9 is a section of the newel post taken in a plane including line 8-8 of FIG. 9.

FIGS. 8 and 9 show an option for "lateral mounting" the upper newel post 20B. For the upper newel post 20B, the column subassembly 44 is turned ninety degrees relative to the boot subassembly 40 such that, as viewed in FIG. 1, the front opening of the boot subassembly faces forward away from the riser of the top step, and the front opening of the column faces to the right. As shown by comparison of FIGS. 1, 8, and 9, the boot 30 is cut to have a custom fit on the stairway 12 and to extend down a side of a stringer of the stairway. The boot subassembly 40 is notched (e.g., a lower end of the rear wall 60 is removed, and lower rear portions of the left and right walls 62, 64 are removed) to nest over the nose of the top step. The notching of the boot subassembly 40 creates a rear opening in the boot subassembly between the left and right walls 62, 64 and below the new bottom end of the rear wall 60. A boot web 52 is received in the forward set of vertical grooves 72 and is anchored to the substructure by suitable fasteners 120 (e.g., screws or bolts). In some installations, a second boot web 52 may be used in the same set of vertical grooves 72 to further anchor the boot subassembly 40 if sufficient room is available. A boot web 52 is also received in a set of horizontal grooves 70 spaced just above the substructure and is anchored to the substructure by suitable fasteners 97 (e.g., screws or bolts) through a rear portion of the boot web. The boot webs 52 are spaced from the substructure and drawn toward the substructure during installation of the fasteners such that the boot subassembly 40 is pressed against and firmly anchored to the substructure.

The column subassembly 44 is anchored to the boot subassembly by a threaded rod connection very similar to the connection discussed with respect to FIG. 7. The threaded rod 54 extends between and is in tension between an upper column web 50 and an upper boot web 52. Upper and lower nuts are threaded toward the upper boot web 52 to mount the threaded rod 54 on the boot web. An upper nut is threaded down onto the rod 54 above the upper column web 50 to tension the rod and anchor the column subassembly 44 on the boot subassembly 40. In this embodiment, the threaded rod 54 does not extend to the lower boot web 52. Fasteners 98 such as screws can be passed through the upper boot web 52 into the lower column web 50 if needed to plumb the column subassembly 44 with respect to vertical.

Figure 10:
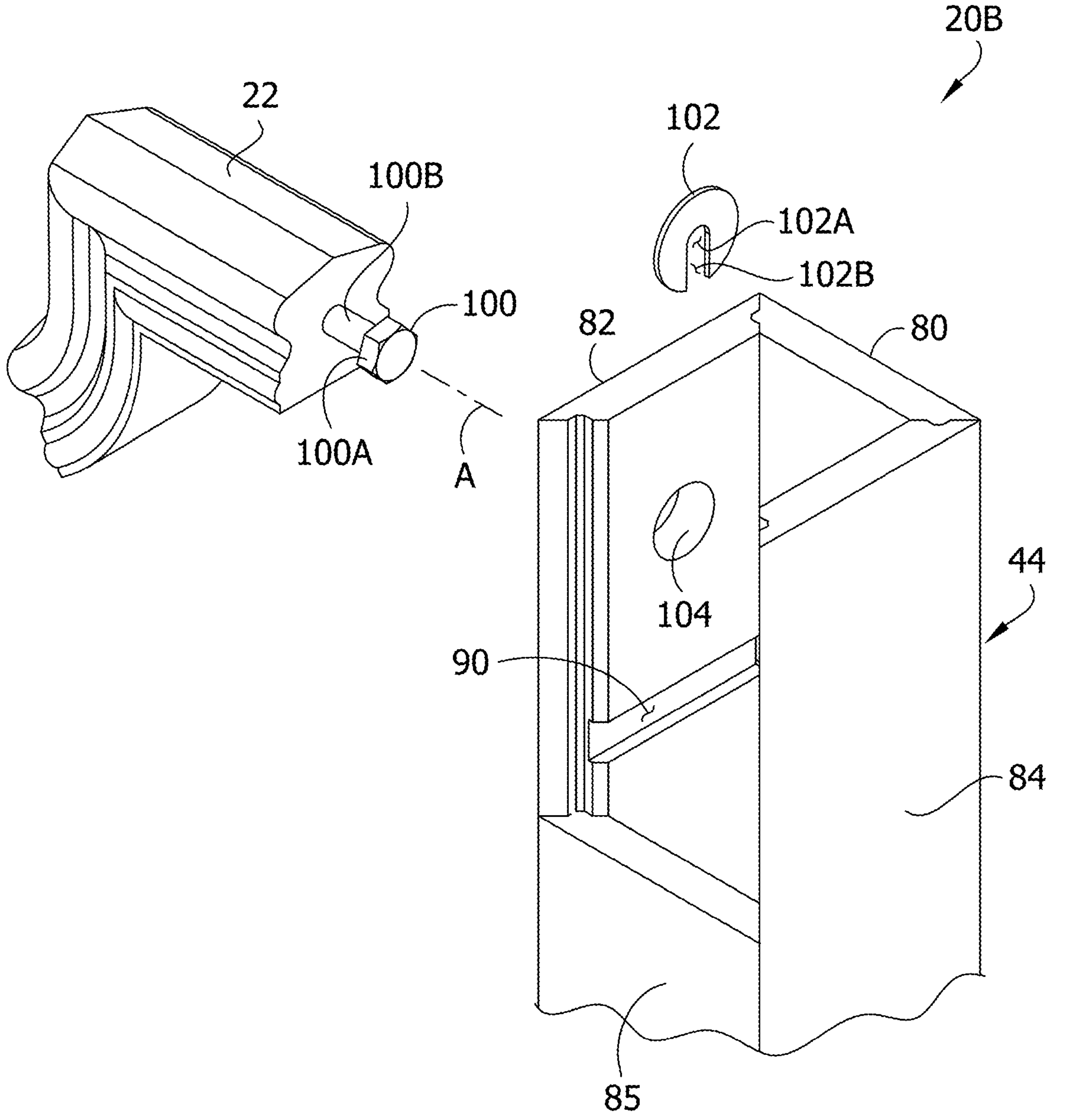
FIG. 10 is an exploded right perspective of a head end of the upper newel post of FIG. 1 illustrating components of a hand rail connection.

The connection of the end of the hand rail 22 to the upper newel post 20B is shown in an exploded view in FIG. 10. The connection is essentially the same as the hand rail connection described above with respect to the lower newel post 20A. The opening 104 in the head of the column subassembly 44 is sized to have a width greater than the head 100A of the bolt 100 threaded in the end of the hand rail section 22. Accordingly, the head 100A of the bolt 100 is receivable through the opening 104 to the interior of the column subassembly 44. The open sided washer 102 can then be moved laterally onto the shank 100B of the bolt 100 between the head 100A of the bolt and the inner face of the column side wall 82. The washer 102 includes an aperture 102A for receiving the shank 100B of the bolt 100 and includes a slot 102B leading laterally from the aperture and opening out the side of the washer. The slot 102B defines a gap between portions of the washer bounding the slot. The gap has a width greater than the width of the shank 100B so the washer 102 can be installed laterally onto the shank. When the washer 102 is on the shank 100B of the bolt 100, the installer can access the head 100A of the bolt with a wrench or ratchet via the front and top openings in the upper end of the column subassembly 44 to thread the bolt further into the end of the hand rail section 22 to create a tight and stable connection of the hand rail to the column subassembly 44. Widths of the head 100A of the bolt 100 and of the washer 102 and column opening 104 can be referenced as being transverse to a longitudinal axis A of the shank 100B of the bolt 100. The washer 102 has a outer width transverse to the axis A greater than the opening 104 in the column subassembly 44 but an inner width less than the head 100A, and the head 100A of the bolt 100 has a width transverse to the axis A less than the width of the opening 104.

Figure 11:
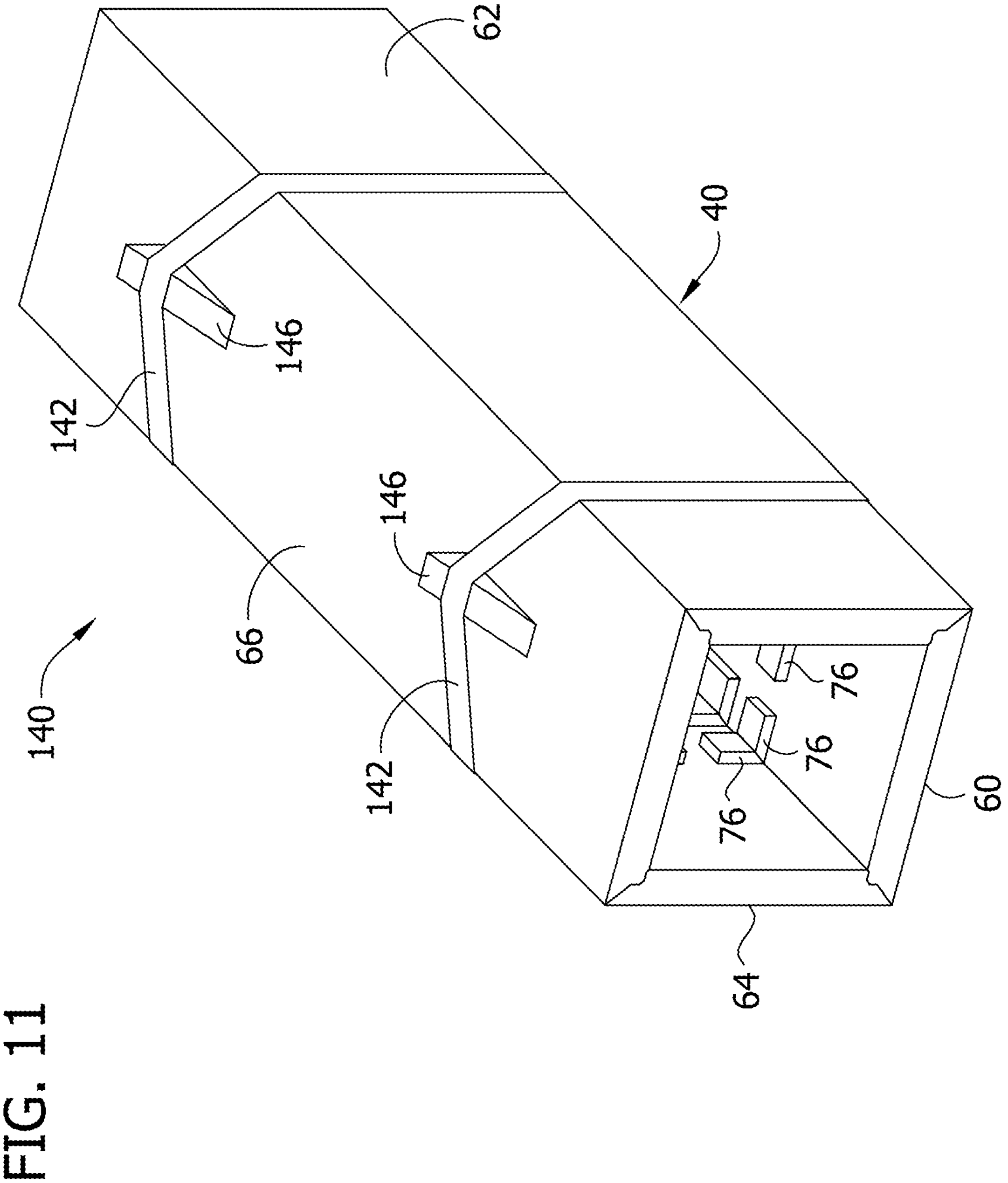
FIG. 11 is a perspective of a boot of a newel post in manufacture.

A method of manufacturing the boot subassembly 40 will now be described with reference to FIG. 11. After manufacture of the rear, left, and right walls 60, 62, 64 and the front cover 66, the boot subassembly 40 can be made by attaching respective sides of the rear, left, and right walls to each other. In one example, this can be done by applying adhesive to at least two sides (e.g., the left and right sides of the rear wall 60, or the rear sides of the left and right walls 62, 64), arranging the three walls 60, 62, 64 and the front cover 66 in box form, and permitting the adhesive to cure. The lock mitres of the walls 60, 62, 64 and the front cover 66 help in arranging the walls and cover in respective perpendicular and parallel relationships to form the box. This process can be facilitated by applying strapping 140 around the box and tensioning the strapping to press the lock mitres against each other to promote formation of ninety degree corners. In the illustrated embodiment, the strapping 140 includes two straps 142 spaced from each other. The straps 142 can be applied by a strapping machine. Desirably, the straps 142 are applied relatively tightly and extend fully around the box. The straps 142 may be sufficiently tensioned by the strapping machine to provide adequate squaring of the corners by abutment of the lock mitres. To further tension the straps 142, wedges 146 can be forced between the straps and the exterior surfaces of the box. Desirably, the straps 142 are drawn tight and held in that configuration until the adhesive cures. Alternatively, fasteners such as nails could be driven through the abutting sides of the walls. Other ways of securing the walls could also be used. Although the strapping 140 holds the front cover 66 on the boot subassembly 40, the sides of the front cover remain unattached to the front sides of the left and right walls 62, 64. Thus, when the strapping 140 is removed, the front cover 66 of the boot 30 is removable from the boot subassembly 40 to provide the open front of the boot subassembly for access to its interior for installation of the boot subassembly. The front cover 66 serves as a template or jig for assisting in properly arranging the walls 60, 62, 64 in manufacturing the boot subassembly 40 and ensuring the cover has a precise fit to close the front opening to provide a pleasing finished appearance (e.g., without gaps at the mitred joints of the cover 66 with the boot subassembly 40) when the cover is installed.

Figure 12:
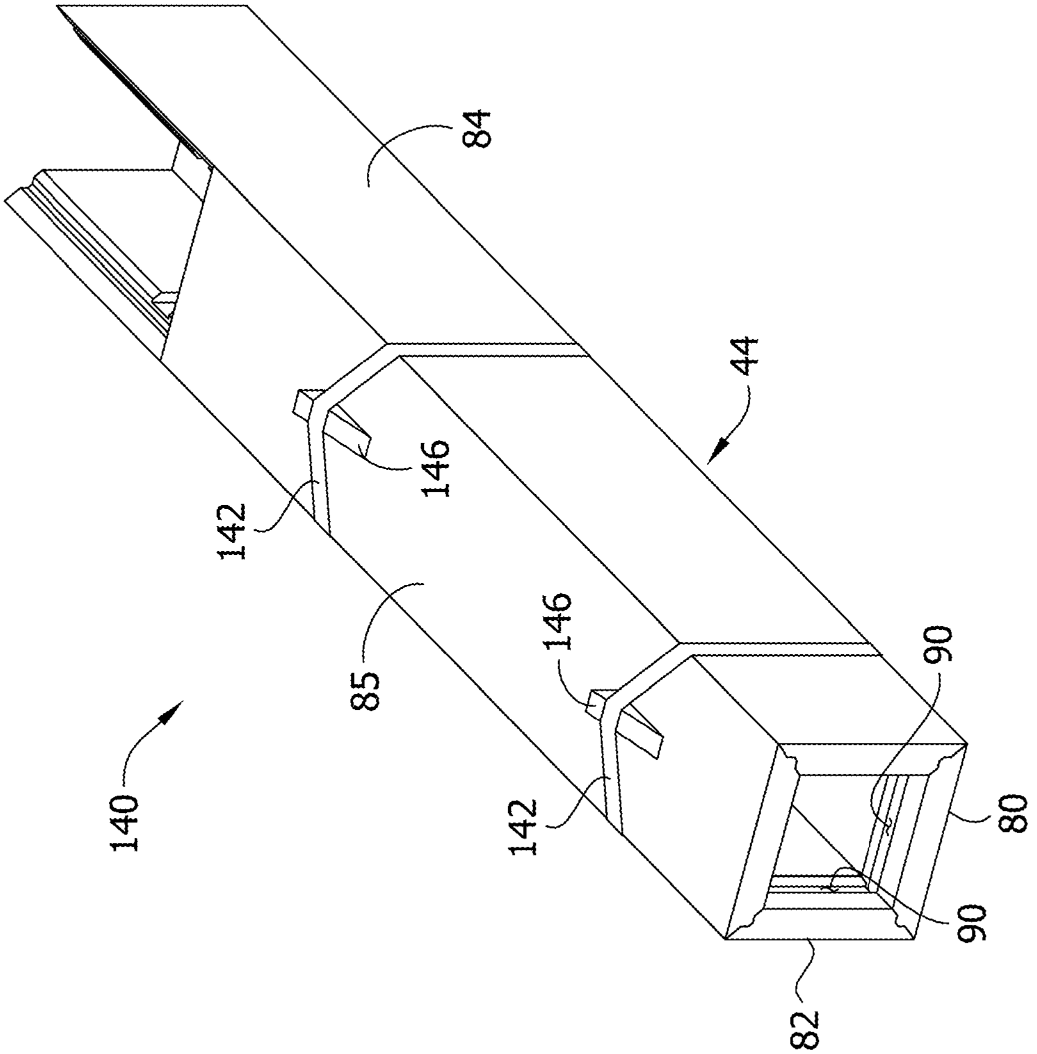
FIG. 12 is a perspective of a column of a newel post in manufacture.

As shown in FIG. 12, the column subassembly 44 can be formed in substantially the same way as the boot subassembly 40. One difference is that adhesive is applied to four joints of the walls 80, 82, 84, 85 such that when the adhesive cures, the four walls are attached to each other at the lock mitre joints. Optionally, the front wall 85 can be left loose like the front cover 66 of the boot subassembly. In manufacturing the column subassembly 44, the front cover 86 does not need to be used to form the box because the front wall 85 and associated lock mitre joints do a sufficient job of properly orienting the left and right side walls 82, 84 for forming the front opening to properly fit the front cover 86. Tensioning of the straps 142 can be facilitated by using the wedges 146 as with manufacturing of the boot subassembly 40. Moreover, fasteners such as nails could be used instead of adhesive for attaching the abutting sides of the walls. Other ways of securing the walls could also be used.

In view of the above, it will be appreciated that hand rail system 18 of the present disclosure provides an installer-friendly solution for hand rail installations. The separate boot subassembly 40 and column subassembly 44 permit convenient installation of the boot subassembly and then installation of the column subassembly onto the plumb and firmly anchored boot. The open front of the boot subassembly 40 provides ample access for the installer to anchor the boot 30 without needing to damage the boot by drilling holes that would leave undesirable visible installation blemishes such as plugs or putty. The open front of the boot subassembly 40 also provides ample access to install the threaded rod 54 in the boot subassembly. Finally, the open upper end of the column subassembly 44 provides ample access to install the threaded rod 54 and to connect the hand rail 22 without requiring damage to the column 32 by drilling holes that would leave undesirable visible installation blemishes such as plugs or putty.

Figure 13:
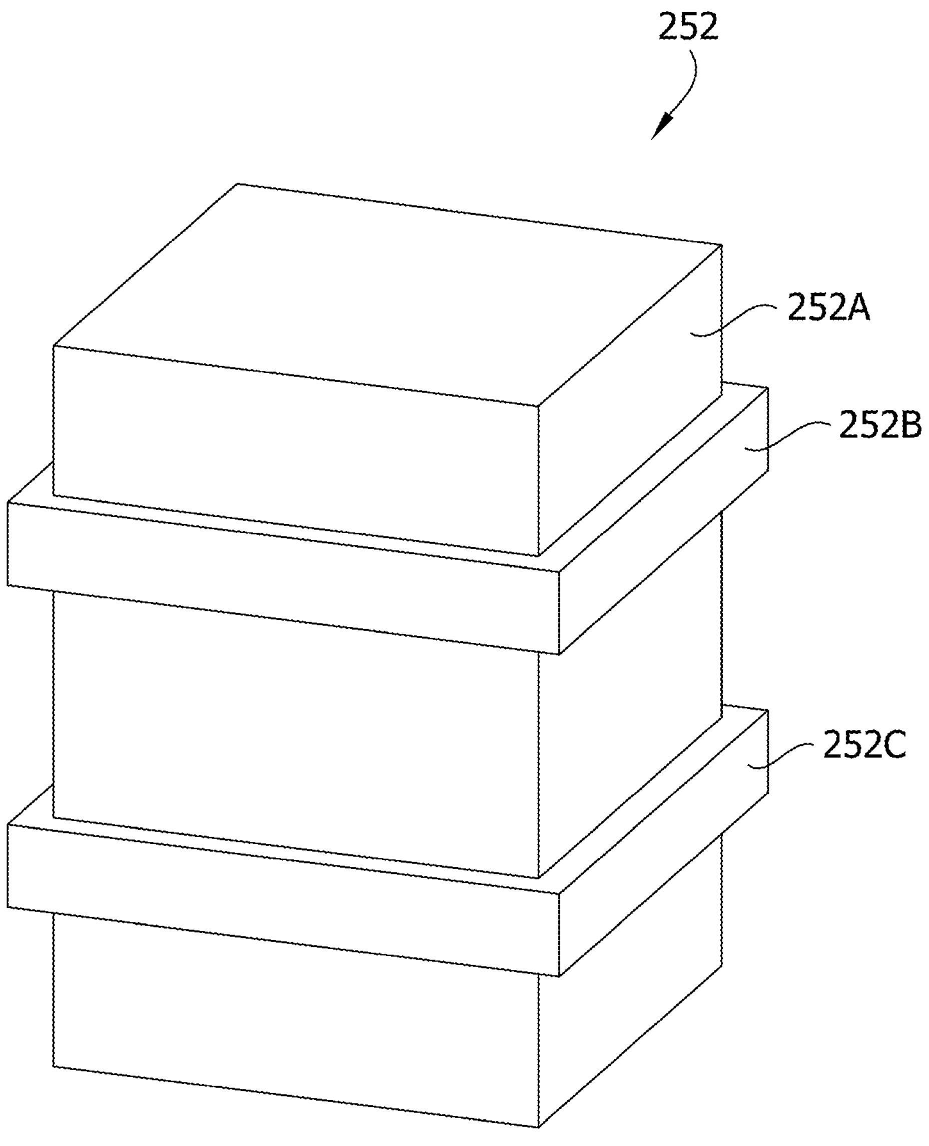
FIG. 13 is a perspective of a newel post mount of the present disclosure.
Figure 14:
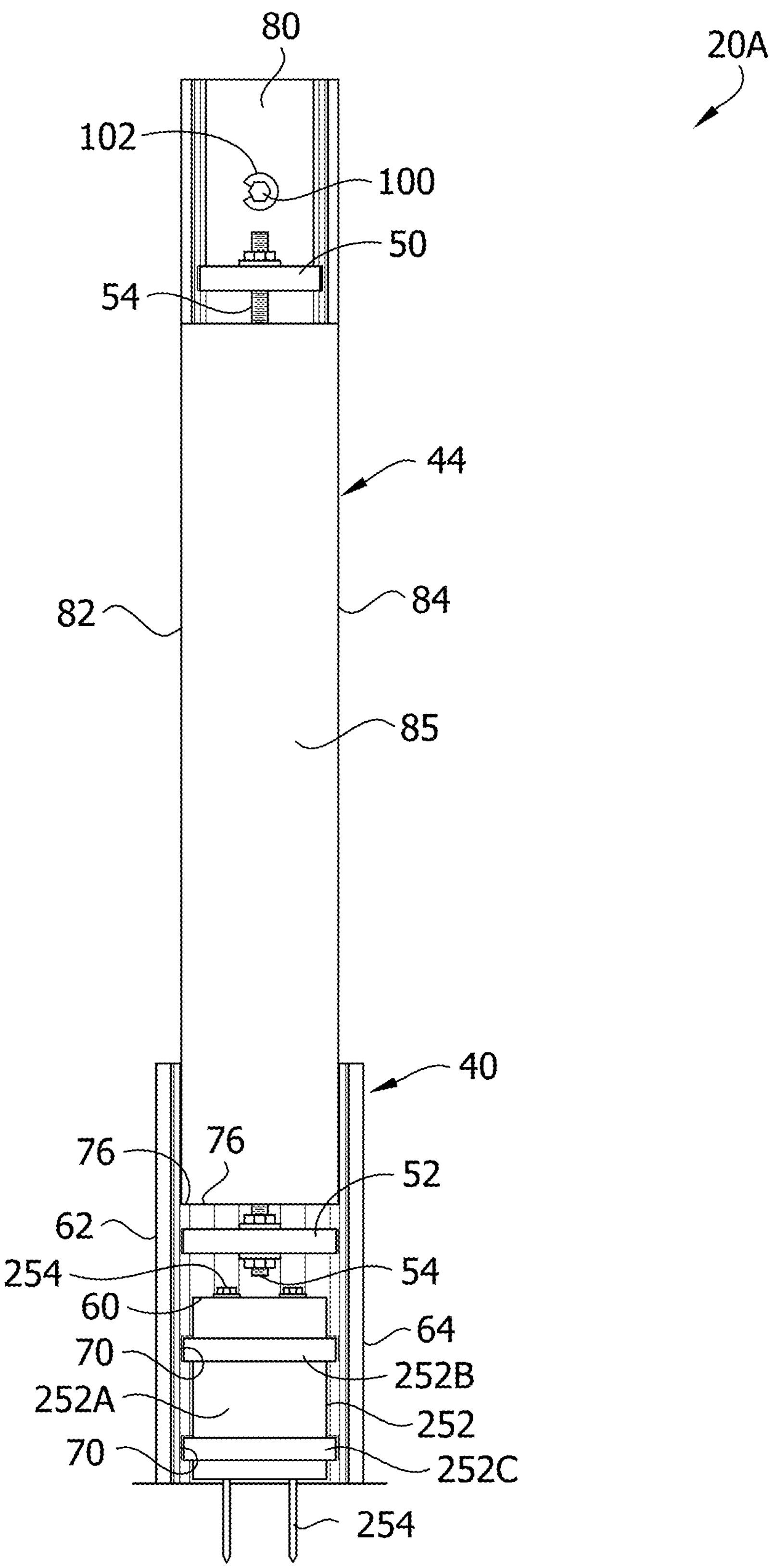
FIG. 14 is a view similar to FIG. 7 but showing use of the mount of FIG. 13 for mounting the newel post.

FIG. 13 shows an alternative embodiment of a mount 252 for use in securing a boot subassembly to substructure. Instead of or in addition to using a boot web 52 as described above, the mount 252 can be used. The mount 252 may be referred to as a web but has a different configuration than the webs 52 described above. The mount 252 comprises a mounting block having a rectangular main body 252A and two flanges 252B, 252C extending around the main body and including flange portions protruding from respective front, rear, left, and right surfaces of the main body. In other embodiments, flanges not extending around the main body could be used. For example, flange portions may be provided on opposite sides of the main body. The main body 252A extends downward below the lower flange 252C and can be trimmed to reduce the height of the mounting block, depending on the desired hand rail height. FIG. 14 is a view of an example installation of the newel post essentially the same as shown in FIG. 7 but using the mount 252 in place of the lower boot web 52. The mount 252 is sized to be received in the boot subassembly 40 through the front opening of the boot subassembly. The upper and lower flanges 252B, 252C of the mount are received in respective pairs of the horizontal grooves 70 in the left and right walls 62, 64 of the boot subassembly 40. Fasteners such as lag bolts 254 can be used to anchor the mount 252 to the substructure. Desirably, the mount 252 is configured or trimmed to be spaced from the substructure so that the fasteners 254 can draw the mount toward the substructure to cause the mount to press firmly against the shoulders of the boot subassembly 64 to securely anchor the boot subassembly. Alternatively, the mount 252 can be sized so the bottom of the mount abuts the surface of the substructure. In the embodiment illustrated in FIG. 14, the mount 252 is used in a "top mount" application, but it will be understood that the mount could also be used in a "lateral mount" application.

Figure 15:
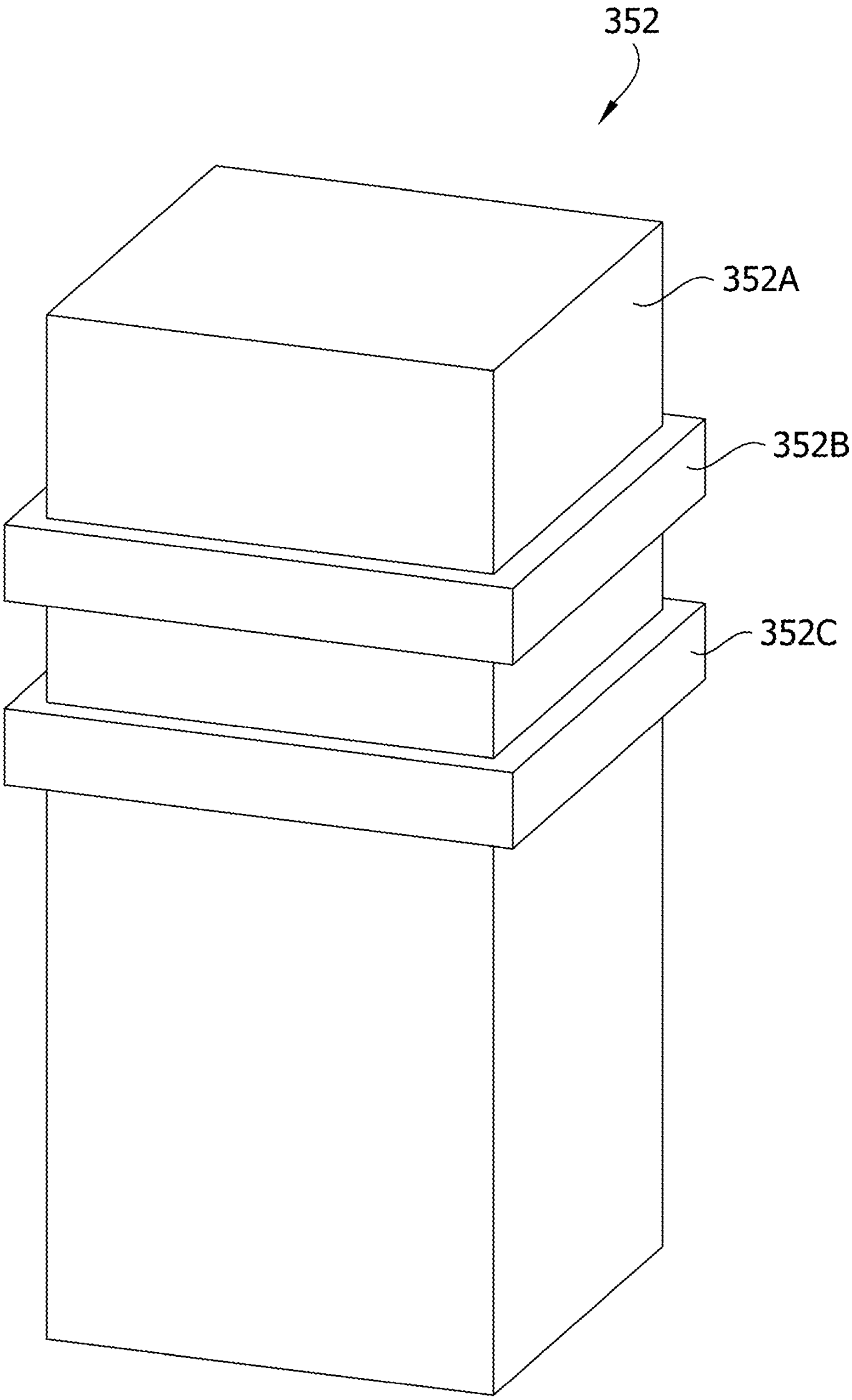
FIG. 15 is a perspective of another newel post mount of the present disclosure.

FIG. 15 shows an alternative embodiment of a mount 352 similar to the mount 252 shown in FIG. 13. For example, the mount 352 includes a main body 352A and two flanges 352B, 352C extending around the main body. The mount is different than the mount in that the portion of the main body 352A below the lower flange 352C is taller. The mount 352 can be used in applications where a higher rail height is desired. For example, the mount 352 could be used in an installation similar to that shown in FIG. 14 but in which the boot subassembly is taller and the grooves of the boot subassembly in which the flanges 352B, 352C are received are spaced higher above the bottom of the boot subassembly.

Figure 16:
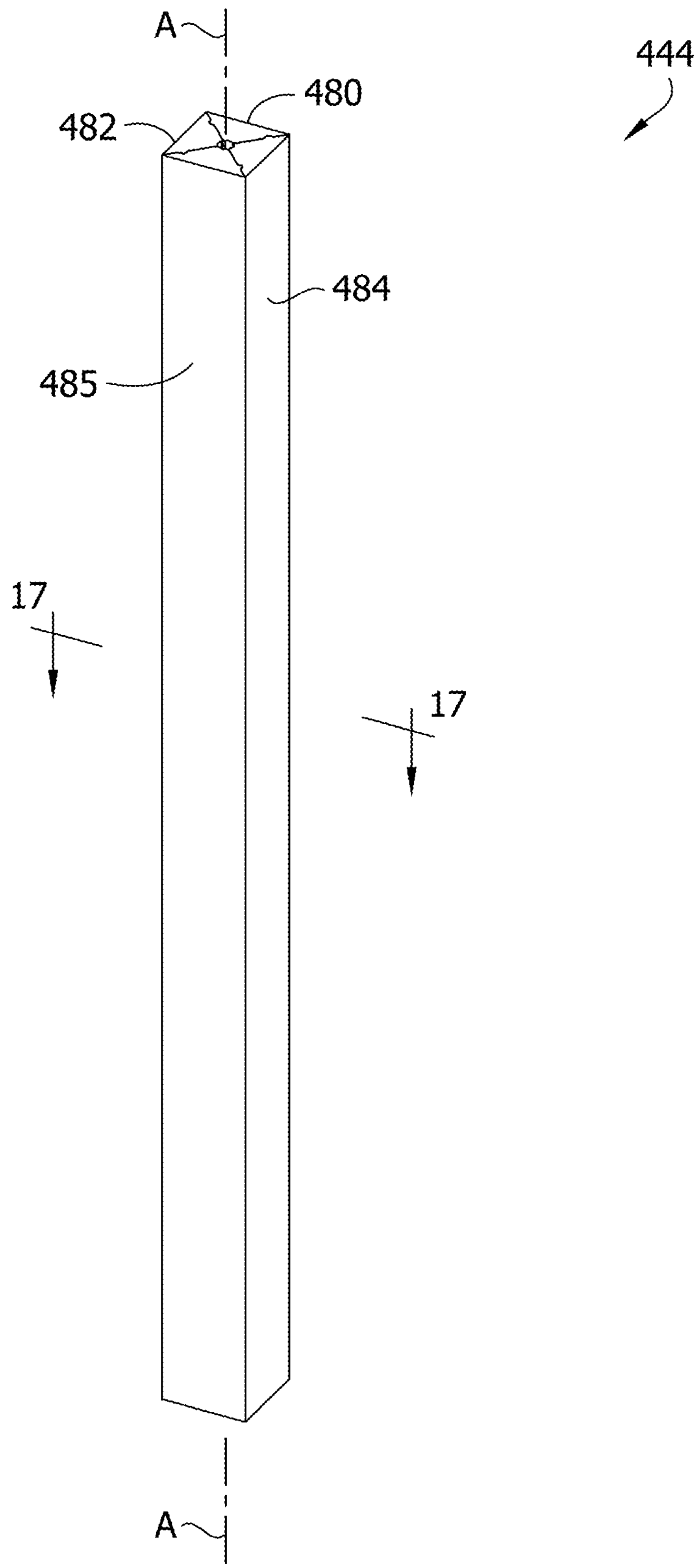
FIG. 16 is a perspective of a newel post subassembly of the present disclosure.
Figure 17:
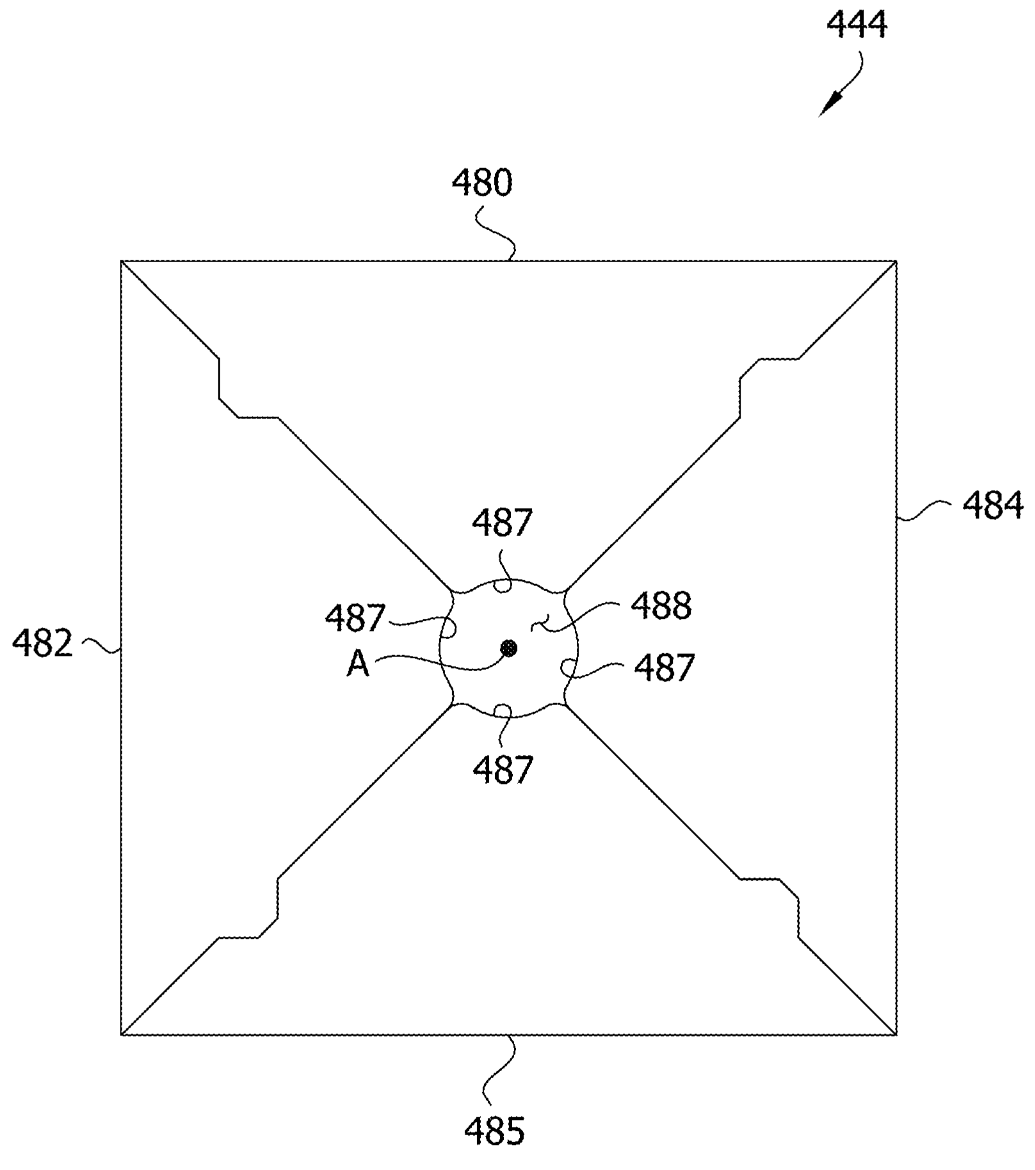
FIG. 17 is a top view of the newel post subassembly of FIG. 16.
Figure 18:
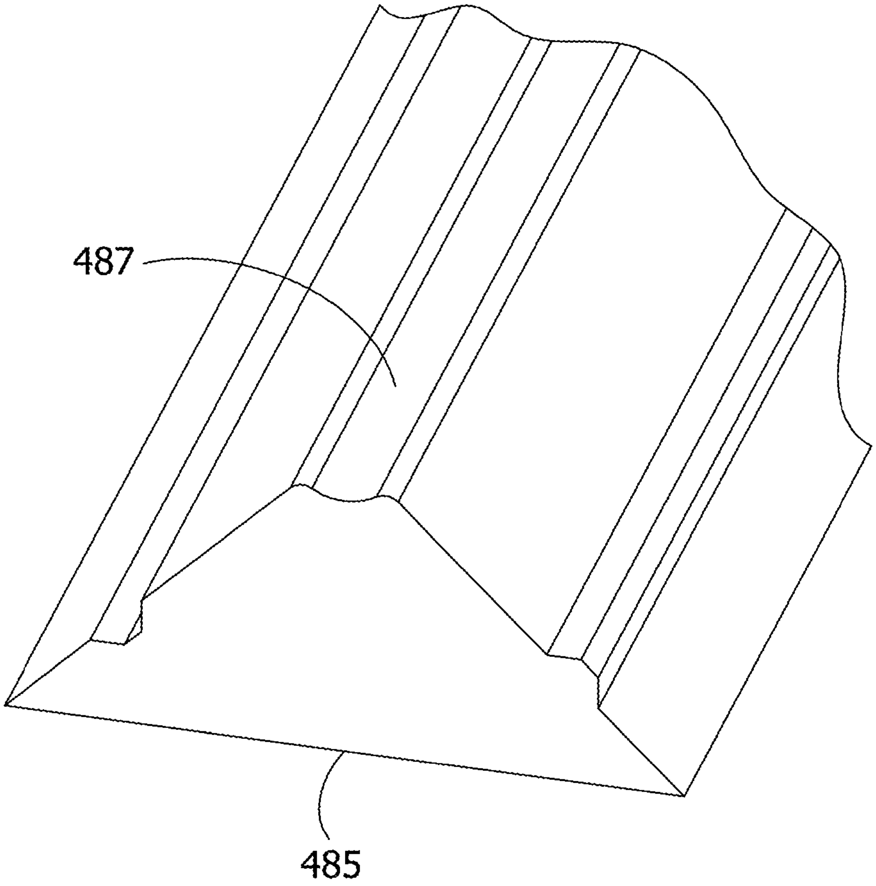
FIG. 18 is a fragmentary perspective of a side wall of the newel post subassembly of FIG. 16.
Figure 19:
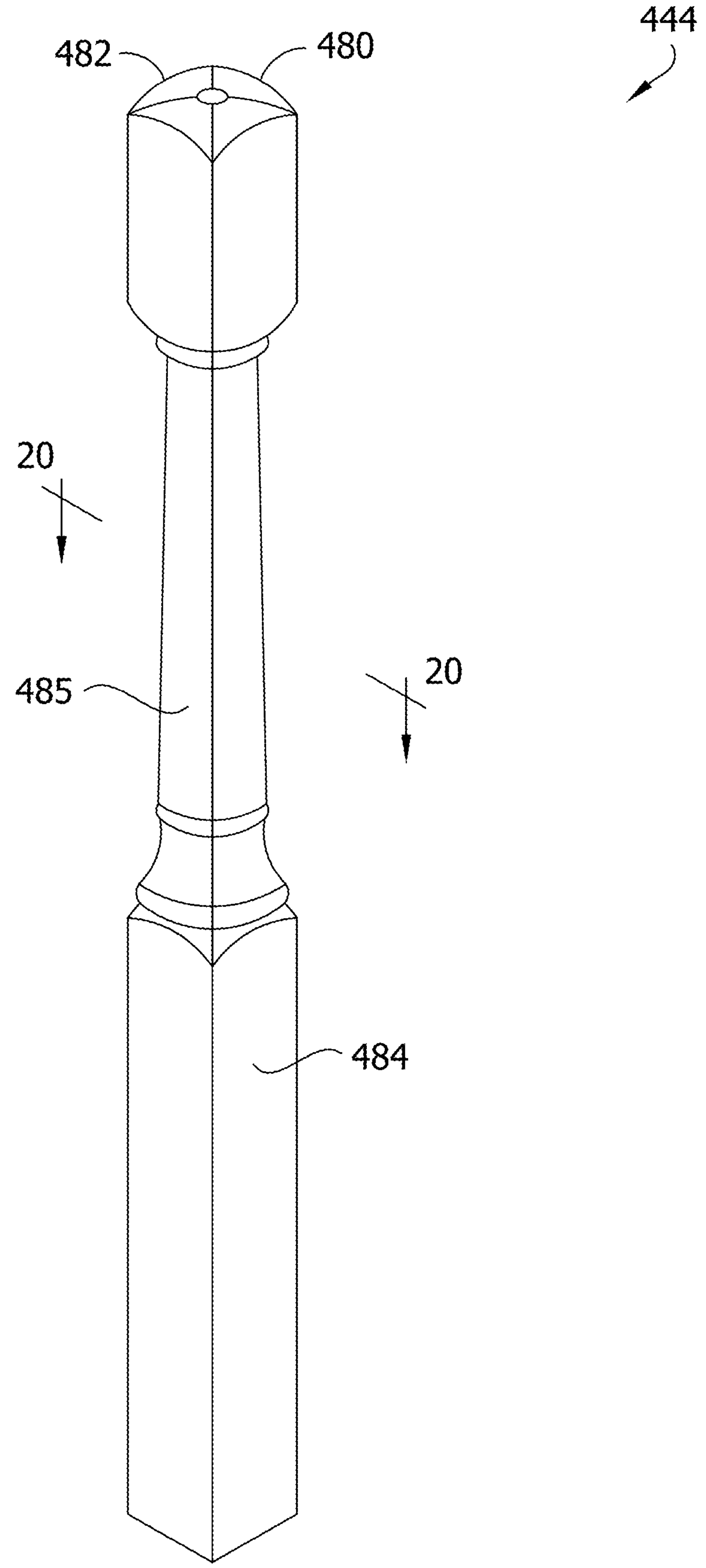
FIG. 19 is the newel post subassembly of FIG. 16 after being turned on a lathe.

Another embodiment of a newel post column 432 (usable with or without a boot) according to the present disclosure will now be discussed with reference to FIGS. 16-22. The newel post column 432 is a four-walled newel post column and may be turned on a lathe and referred to as a turned newel post. Other numbers of walls can be used without departing from the scope of the present invention. An example of a finished turned newel post column 432 is shown in FIG. 19. Before being turned on a lathe, the newel post column 432 can have the construction shown in FIG. 16 and can include walls 480, 482, 484, 485 such as shown in closer detail in FIGS. 17 and 18. An example installation of a newel post 420 including the newel post column 432 of FIGS. 16 and 17 is shown in section in FIG. 21. In another example (not shown), the newel post column 432 of FIG. 16 could be used in a newel post installation without being turned on a lathe.

The newel post column 432 includes a rear wall 480, a left wall 482, a right wall 484, and a front wall 485. Each of the walls 480, 482, 484, 485 has an inner face facing an interior of the newel post column and an outer face opposite the inner face. Each of the walls 480, 482, 484, 485 also has opposite top and bottom ends. The rear wall 480 has left and right sides connected to rear sides of the left and right walls 482, 484. The front wall 485 has left and right sides connected to the front sides of the left and right walls 482, 484. The abutting wall sides can be attached to one another by glue or another suitable adhesive or by fasteners (e.g., nails). The sides of the walls 480, 482, 484, 485 (i.e., the left and right sides of the rear and front walls, and the front and rear sides of the left and right walls) are all mitred in the illustrated embodiment. More specifically, the sides are formed to have corresponding lock mitres. The engagement of the mitred sides forms mitred joints at corners of the newel post column, and the lock mitres assist in arranging the walls to form the column. In manufacture, the four walls 480, 482, 484, 485 can be made as identical components (e.g., using a moulder or a router). The walls 480, 482, 484, 485 can be arranged into the four-walled assembly, and strapping and wedges can be applied as described above for manufacturing the newel post column.

Figure 20:
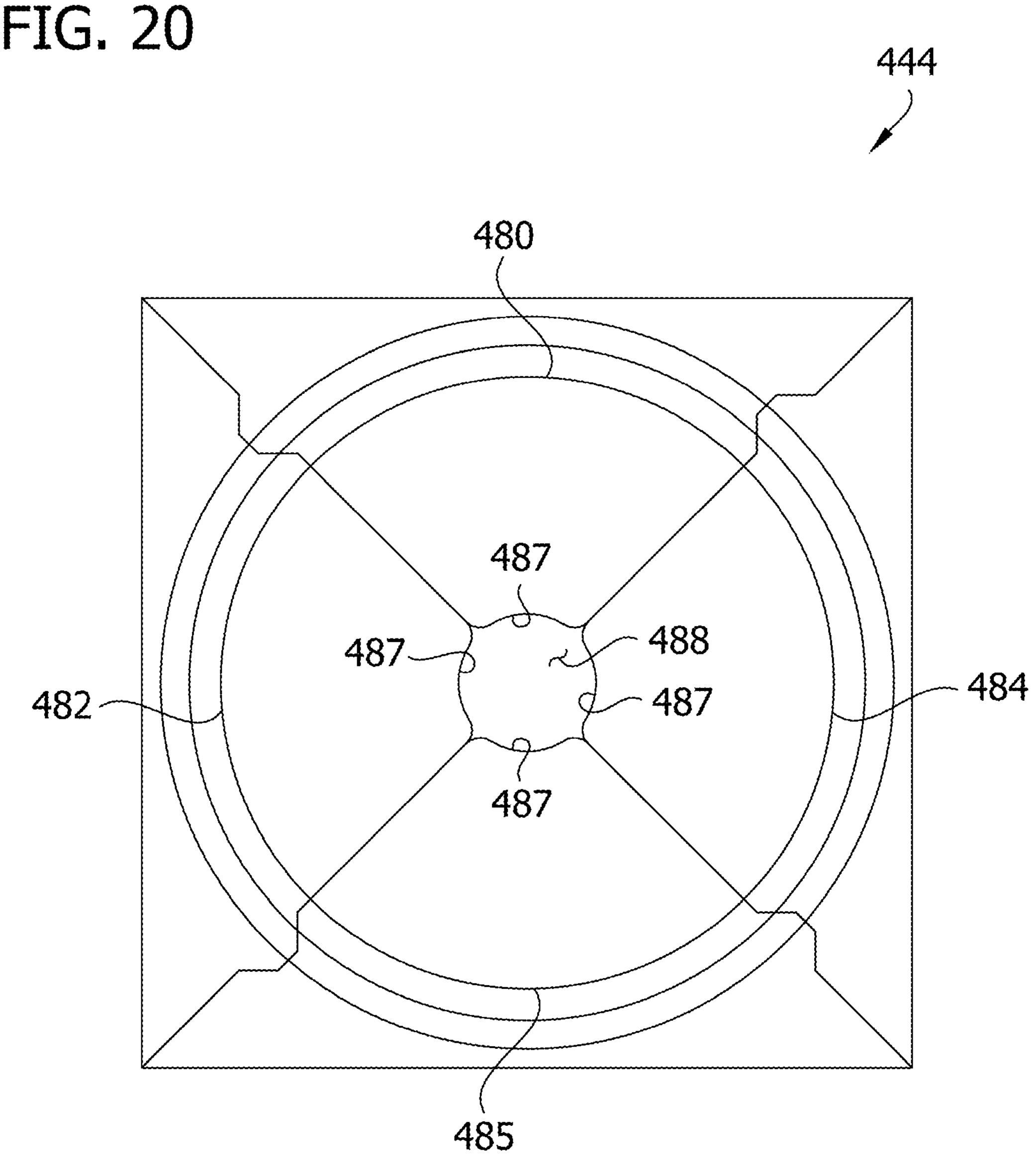
FIG. 20 is a section of the newel post subassembly taken in a plane including line 20-20 indicated in FIG. 19.

The inner faces of the walls 480, 482, 484, 485 include elongate arcuate or concave recesses 487 such that the newel post column has a bore 488 having a generally circular cross section extending from the top of the newel post column to the bottom of the newel post column. The bore 488 passes through the full height of the newel post column 432 and is concentric with a longitudinal center axis A of the newel post column. Constructing the newel post column 432 of four identical walls 480, 482, 484, 485 naturally defines the top and bottom openings of the bore 488 to be concentric with the longitudinal axis A of the newel post column. This is particularly useful for installing the newel post column 432 on a lathe for turning the newel post column about an axis of rotation the same as the longitudinal center axis A of the newel post column. It will be understood that the newel post column 432 can be worked on the lathe to provide various turned newel designs, one of which is shown in FIG. 19. The turned newel post column 432 includes segments having rounded exterior surfaces that define generally circular cross sections of the newel post column at locations between the top and bottom of the newel post column. One such generally circular cross section is shown in FIG. 20.

Figure 21:
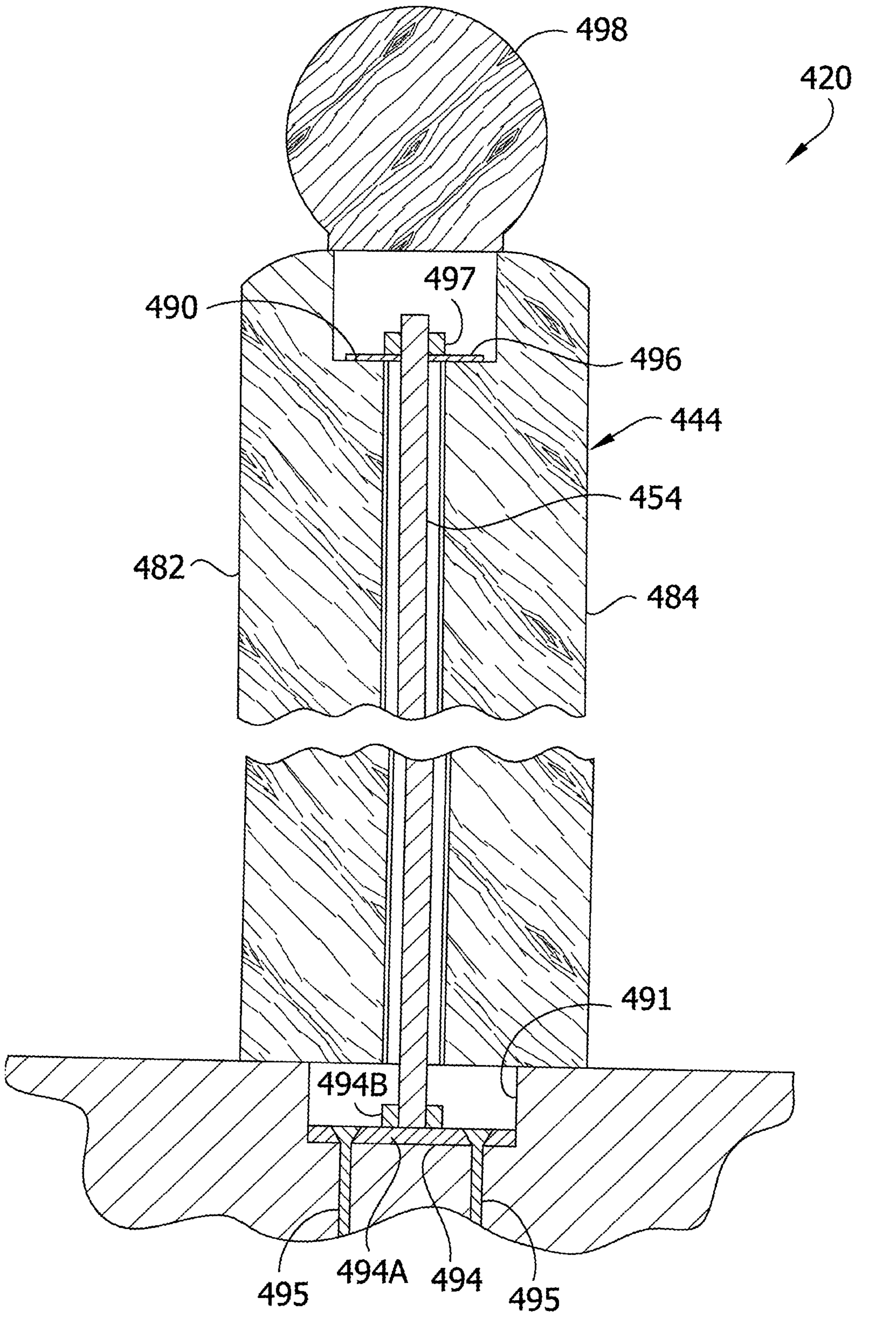
FIG. 21 is a fragmentary section of an installed newel post including the newel post subassembly of FIG. 19.
Figure 22:
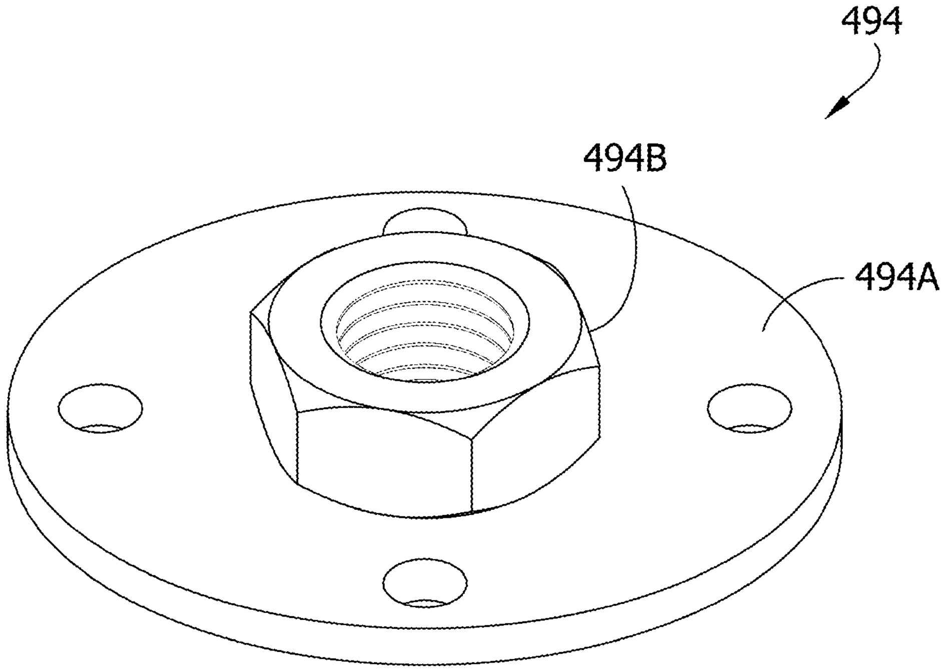
FIG. 22 is a perspective of a newel post mount of FIG. 21.
Figure 23:
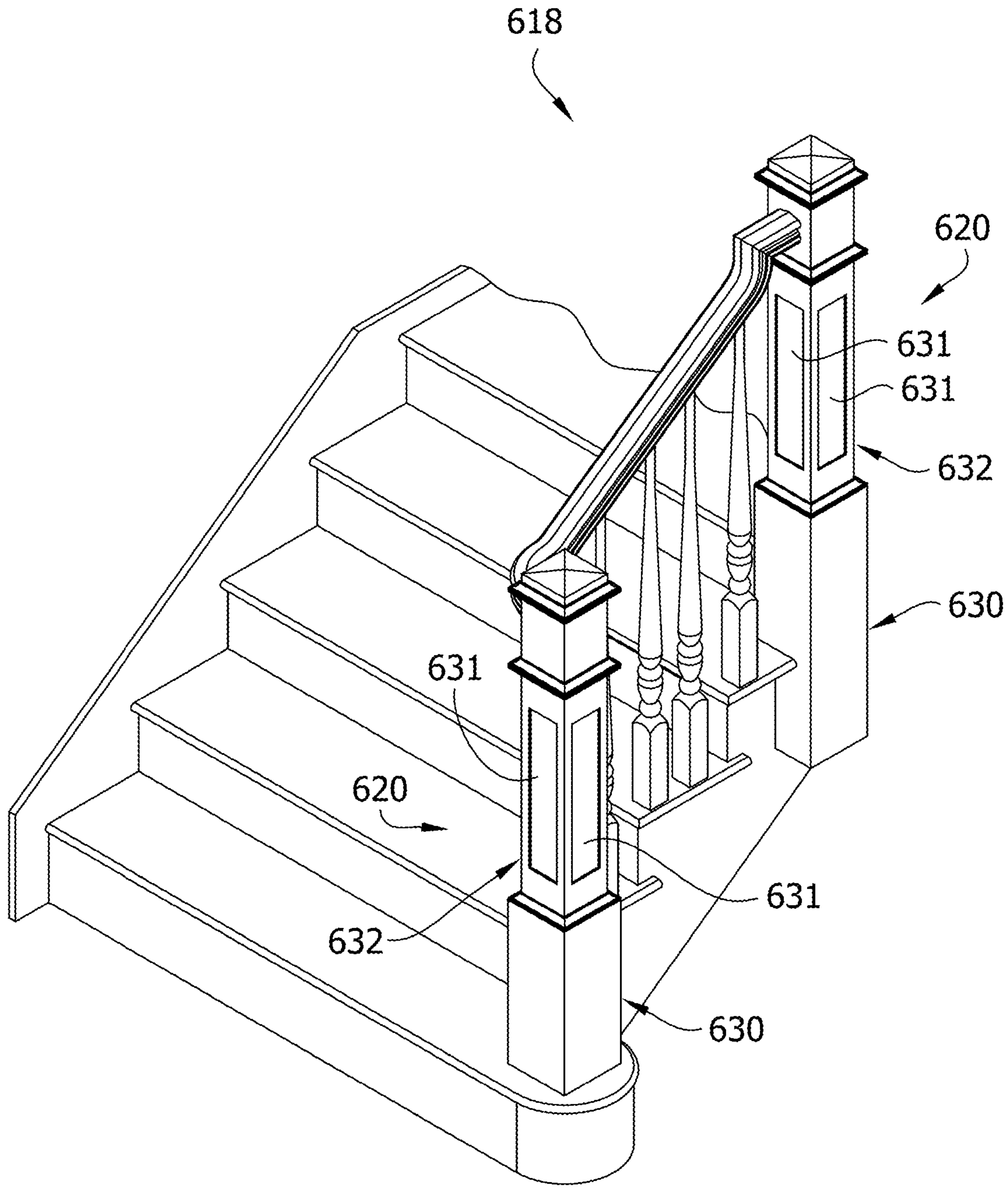
FIG. 23 is a perspective of another staircase including a hand railing system having a lower newel post and an upper newel post.

The bore 488 in the newel post column 432 can also be useful in installing the newel post column. Referring to FIG. 21, in one example, a threaded rod 454 can be installed in the bore 488 for anchoring the newel post column 432. Before installing the threaded rod 454, the opening in the top of the newel post column is enlarged to create a shoulder 490 below the top of the newel post column. Alternatively, the shoulder at the original top opening of the newel post column 432 could be used. A hole saw can be used to form a generally circular or cylindrical recess 491 in the substructure to which the newel pole column 432 is to be mounted. An anchor, such as the anchor 494 shown in closer detail in FIG. 22, can be installed in the circular recess 491. The illustrated anchor 494 includes a generally circular plate 494A having a nut 494B welded thereon. In other embodiments, the plate itself could include the threaded opening. Desirably, the plate 494A has a size closely corresponding to the circular recess 491 such that reception of the anchor 494 in the recess automatically centers the threaded opening of the anchor on center with the circular recess, which results in centering the newel post column 432 with the circular recess. The anchor 494 can be secured to the substructure by passing fasteners 495 (e.g., screws or bolts) through the anchor into the substructure. Desirably, the recess 491 in the substructure has a height greater than the height of the anchor 494 such that a top surface of the anchor is flush with or below the top surface of the substructure. The bottom of the newel post 420 rests on the top surface of the substructure, and the threaded rod 454 is threaded into the anchor 494. A washer 496 and nut 497 (broadly, "fastener") are installed on the upper end of the threaded rod 454 such that the washer 496 presses against the shoulder 490 to tension the rod to firmly anchor the newel post column 432 in a stable fashion. The top opening of the newel post column 432 can be covered with a finial or cap 498 to complete the installation of the newel post 420.

Although not shown in FIG. 21, it will be understood that a hand rail could be connected to the newel post 420 in a fashion very similar to that described with respect to FIG. 4. In such a case, the shoulder 490 in the bore 488 could be lower in the newel post column to provide clearance for the connection in the bore above the top of the threaded rod 454 and nut 497. It will be appreciated that such an installation of the threaded rod 454 to the substructure and the hand rail to the newel post 420 results in the newel post not having any puttied or plugged holes in a side of the newel post resulting from installation.

Another embodiment of a newel post 620 of the present disclosure will now be described with reference to FIGS. 23-29. Two such newel posts 620 are shown in the example hand rail system 618 illustrated in FIG. 23. The newel posts 620 include a panel and panel retainer system. In the illustrated embodiment, the newel posts 620 are shown as box newels having flat panels 631, but other types of newels and panels, such as raised panels, can be used without departing from the scope of the present invention. It is contemplated that the panels 631 could be made of wood, glass, plastic, and/or metal. Moreover, the panels 631 could be covers for speakers housed inside the newel posts.

Figure 24:
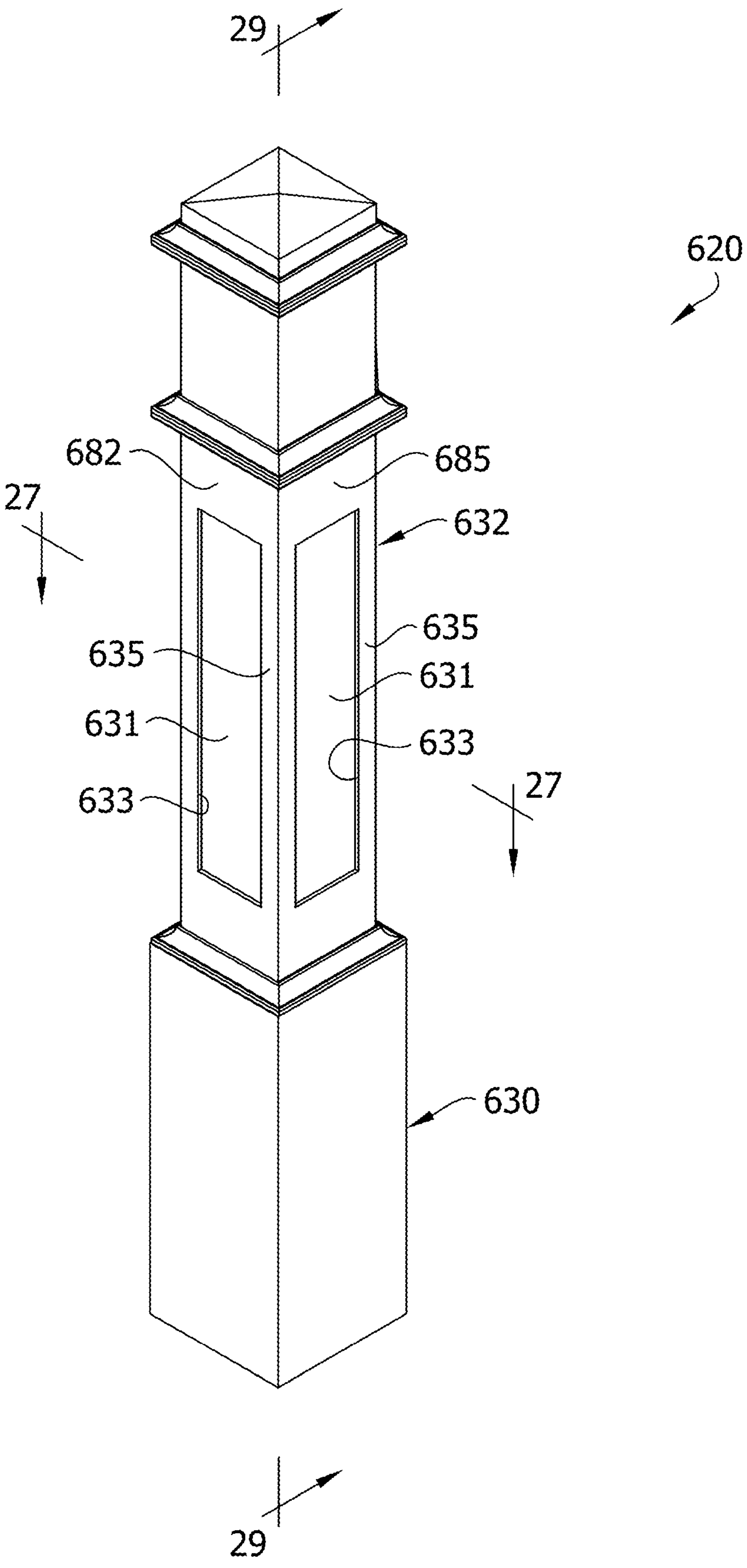
FIG. 24 is a perspective of the lower newel post of FIG. 23.
Figure 25:
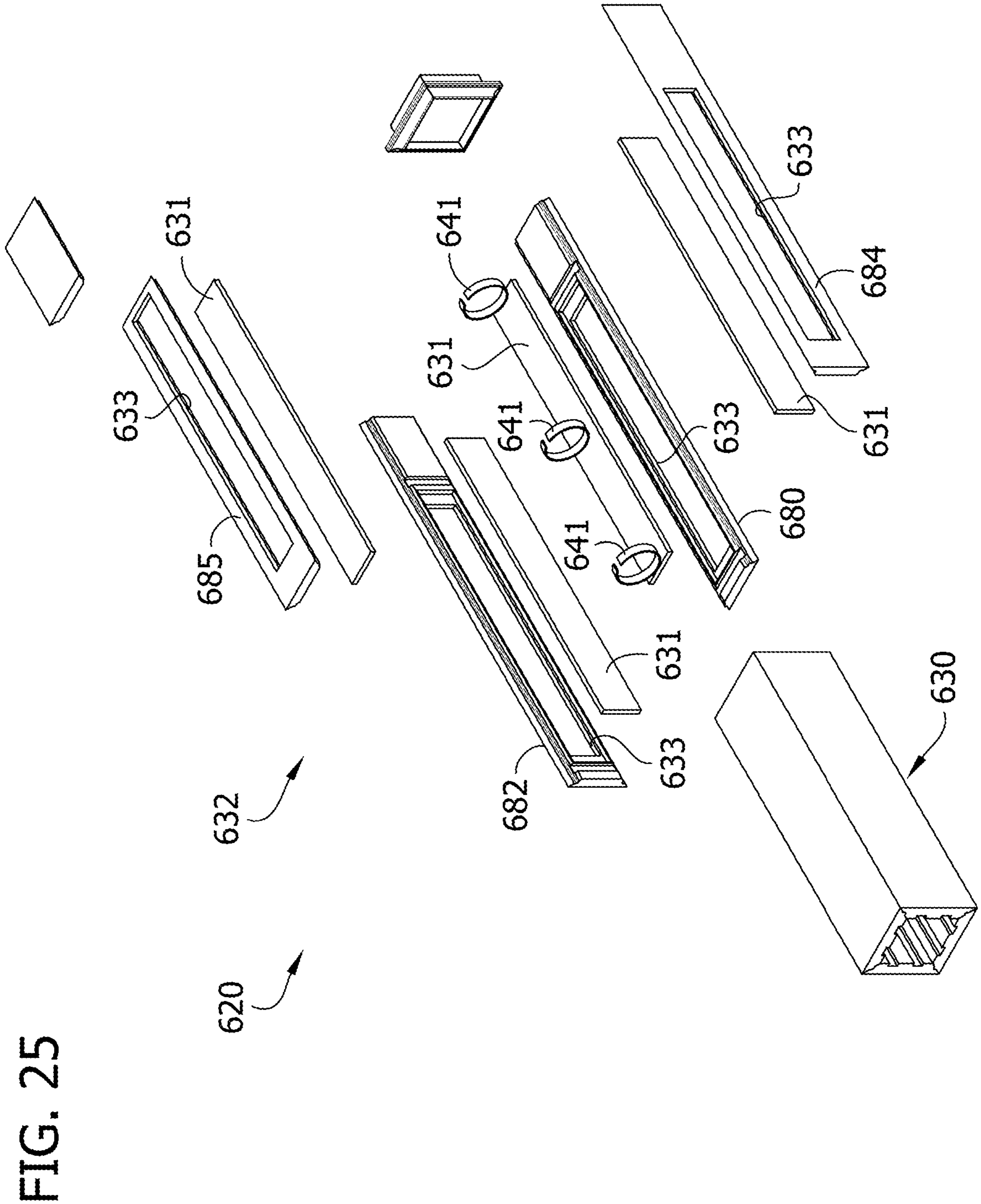
FIG. 25 is an exploded perspective of components of the lower newel post.

Referring to FIG. 24, the newel post 620 includes a boot 630 and a column 632 (collectively or individually, broadly, "body"). The boot 630 and column 632 have essentially the same constructions as the boot 30 and column 32 of the embodiment described above with respect to FIGS. 1-14, and like parts are indicated by like reference numbers, plus 600. In this embodiment, the walls 680, 682, 684, 685 of the column 632 include openings 633 covered by the panels 631 to provide a decorative appearance to the exterior of the column. Each of the walls 680, 682, 684, 685 of the column 632 includes an inner face that faces the interior of the column and an outer face opposite the inner face. Likewise, the panels 631 each have an inner face that faces the interior of the column 632 and an outer face opposite the inner face. The walls 680, 682, 684, 685 are constructed to have the openings 633 in the walls bounded by lips or peripheral edge margins 635 (FIG. 26) extending around the openings. The inner faces of the walls include recesses 637 (FIG. 26) such that inward-facing surfaces 635A of the lips 634 are recessed in the inner faces of the walls. The recesses 637 are sized to receive the panels 631 to locate the panels vertically and horizontally in registration with the openings 633 to cover the openings.

Figure 28:
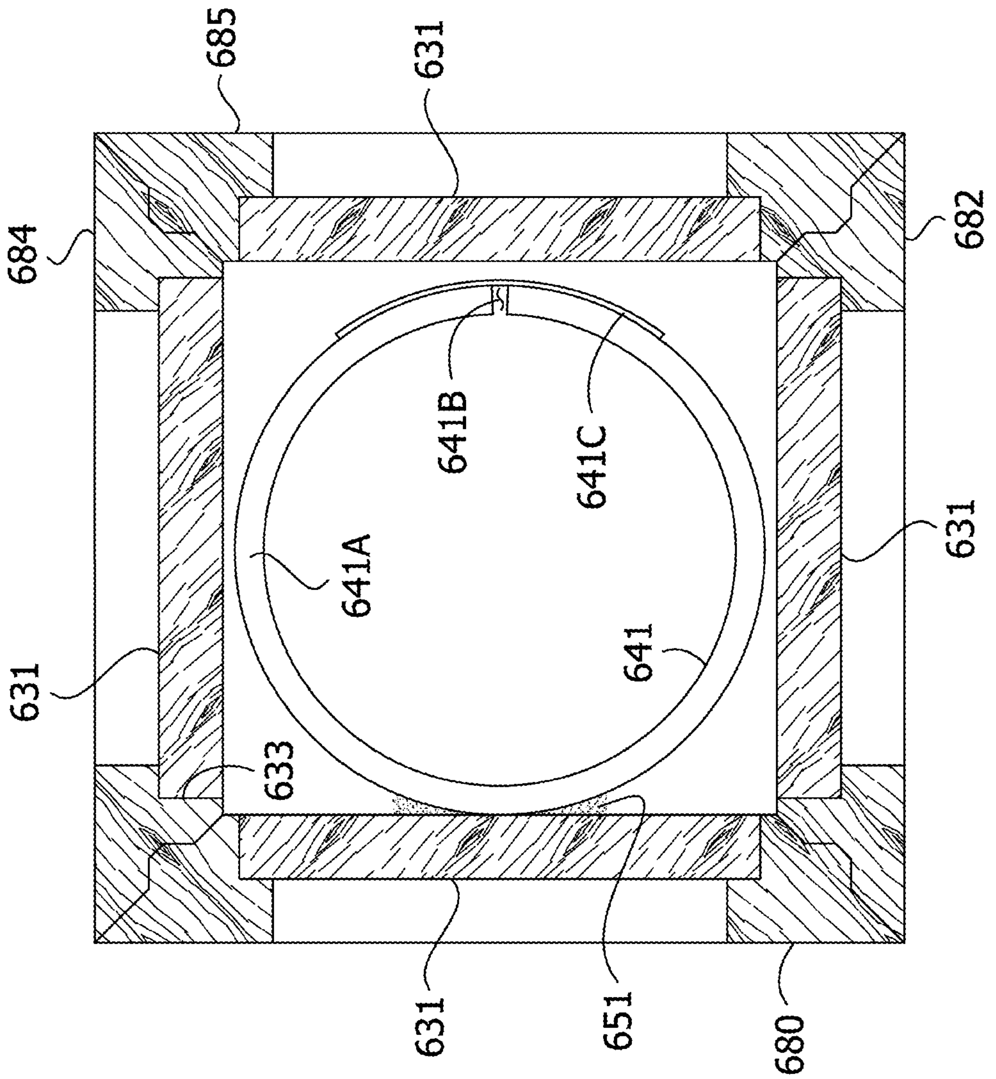
FIG. 28 is a section similar to FIG. 27 but showing a retainer of the newel post in a pre-retaining configuration.

To hold the panels in place, the newel post 620 includes a retainer system including multiple panel retainers 641. In the illustrated embodiment, three panel retainers 641 are provided, but other numbers (e.g., one, two, etc.) could be used. The panel retainers 641 are configured to press on the inner faces of the panels 631 to cause the outer faces of the panels to press against the lips 635 of the walls to maintain the panels in the recesses 637 of the walls 680, 682, 684, 685. In the illustrated embodiment, the retainers 641 each comprise a generally C-shaped retainer body 641A. The retainer bodies 641A may be formed by cutting sections of PVC pipe (or other suitable material) and cutting away portions of the side walls of the pipe sections to provide gaps 641B between free ends of the retainer bodies. The gaps 641B in the retainer bodies 641A permit the retainer bodies to be resiliently compressed to reduce the width of the gap. Desirably, the outside diameter of the PVC pipe is selected to be larger than the distance between opposing inner faces of the panels 631 in the column 632. Accordingly, the retainer bodies 641A in an at-rest state have widths corresponding to the outside diameter of the PVC pipe, greater than the distance between the opposing inner faces of the panels 631 in the column 632. When the retainer bodies 641A are retracted by resiliently compressing them to reduce the width of the gap 641B, the retainer bodies are desirably lesser in width than the distance between the opposing inner faces of the panels 631. To temporarily maintain the retainer bodies 641B in their retracted states, tape 641C can be applied to connect the opposite free ends of the retainer bodies. The retainer bodies 641A can be secured to an inner face of one of the panels 631 with adhesive 651 (FIG. 28) or by other means. After the retainer bodies 641A are retracted and held in the retracted state by tape 641C (one retainer body shown in such a configuration in FIG. 26), the walls 680, 682, 684, 685 and panels 631 can be arranged to form the column 632, a section of which is shown in FIG. 28. For example, as explained above, adhesive can be applied to the mitred sides of the walls 680, 682, 684, 685, and strapping could be applied, to assemble the column subassembly with the panels in the wall recesses 637. Alternatively, the panels 631 can be installed after the mitred sides of the walls 680, 682, 684, 685 are secured to each other (e.g., by insertion through the top or bottom opening of the column subassembly).

Figure 26:
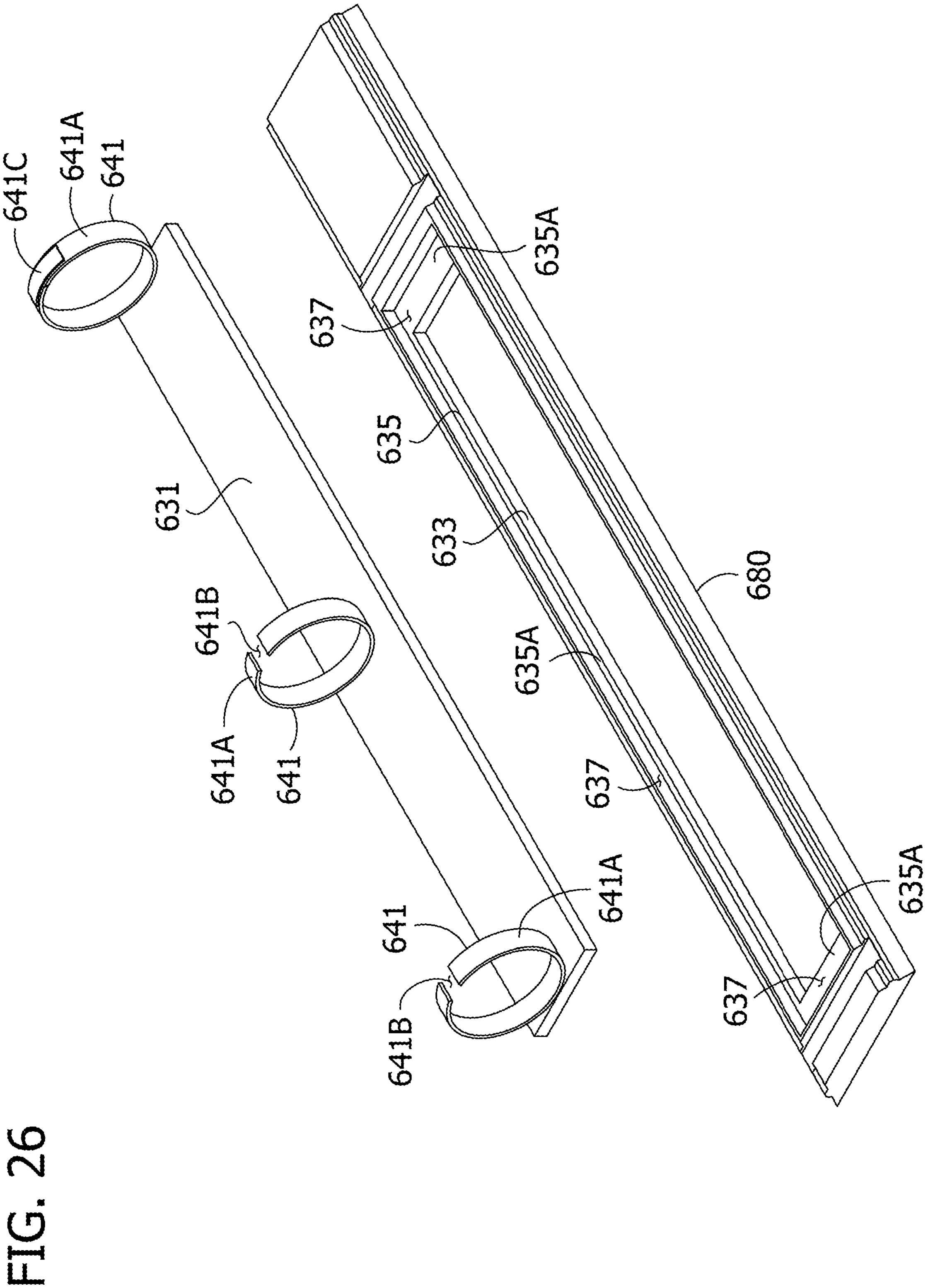
FIG. 26 is a perspective of a side wall of the newel post, a panel of the newel post, and retainers on the panel.
Figure 27:
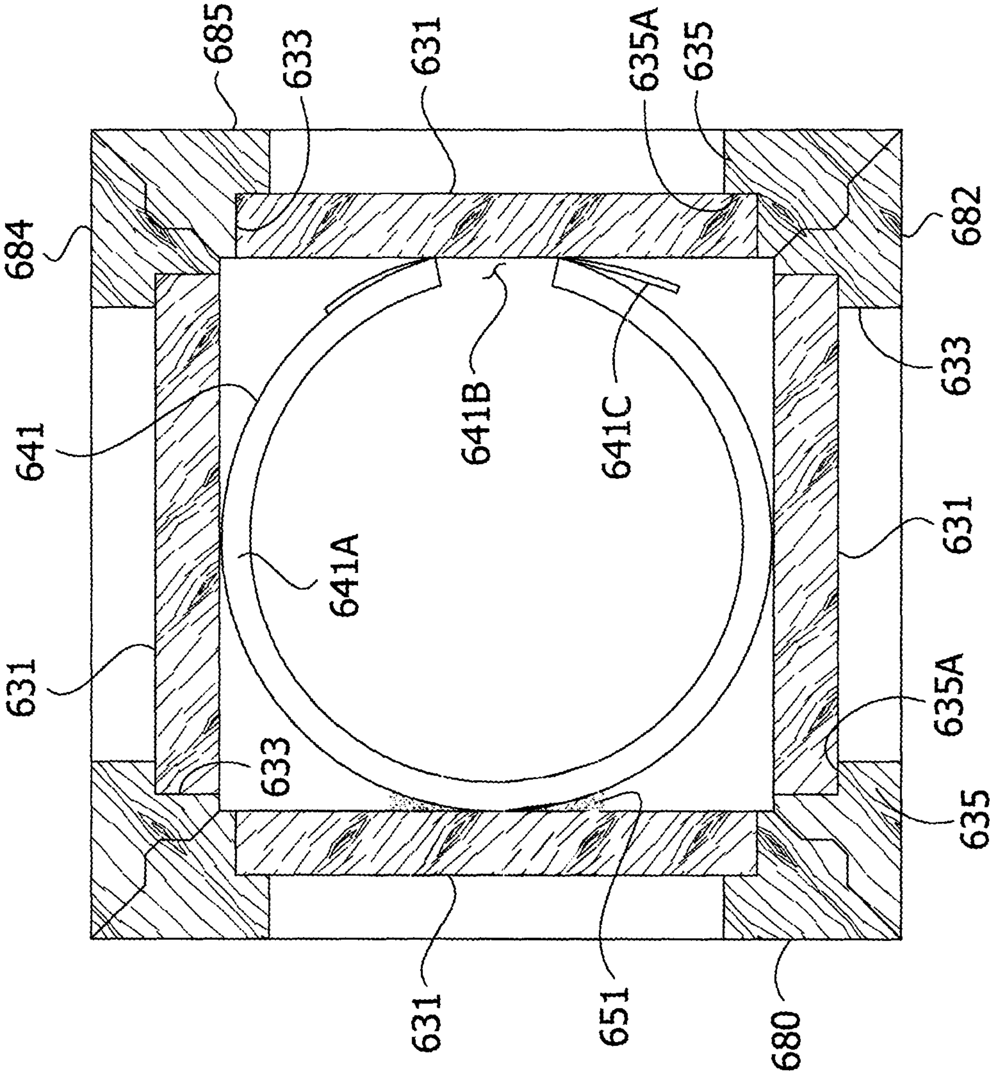
FIG. 27 is a section of the newel post taken in a plane including line 27-27 of FIG.

The tape 641C temporarily holds the retainer bodies 641A in the retracted states as shown in FIG. 26. After a short time, the tape 641C fails (e.g., FIG. 27) and permits the retainer bodies 641A to resiliently expand. The retainer bodies 641A attempt to expand to their original at-rest configurations but are captured in the interior of the newel post column 632, where the width between inner faces of the panels 631 is less than the width of the retainer bodies 641A in their fully expanded configurations. The result is the retainer bodies 641A remain resiliently compressed between opposing inner faces of the panels 631 and press all four panels outward to maintain them in position in their respective recesses 637. It will be appreciated that other types of retainers (e.g., having retracted and expanded configurations, or other constructions for pressing on the panels) could be used without departing from the scope of the present invention.

The retainer system is advantageous because it is simple and easy to install, the fabrication of the column 632 is simplified, and the panels 631 "float" somewhat to permit expansion and contraction. As illustrated, the panels 631 can be installed free of any fastener directly securing the panel to the column body. In addition, the interior of the column 632 remains open for reception of a threaded rod for anchoring the column such as explained above. Moreover, the arrangement is such that the walls 680, 682, 684, 685 of the column body are free of lips backing peripheral edge margins of the panels 631 at the inner faces of the panels. In conventional construction of box newels having raised or flat panels, fabrication of the walls is substantially more complicated to capture the panels between inboard and outboard lips of members assembled to form the wall.

Figure 29:
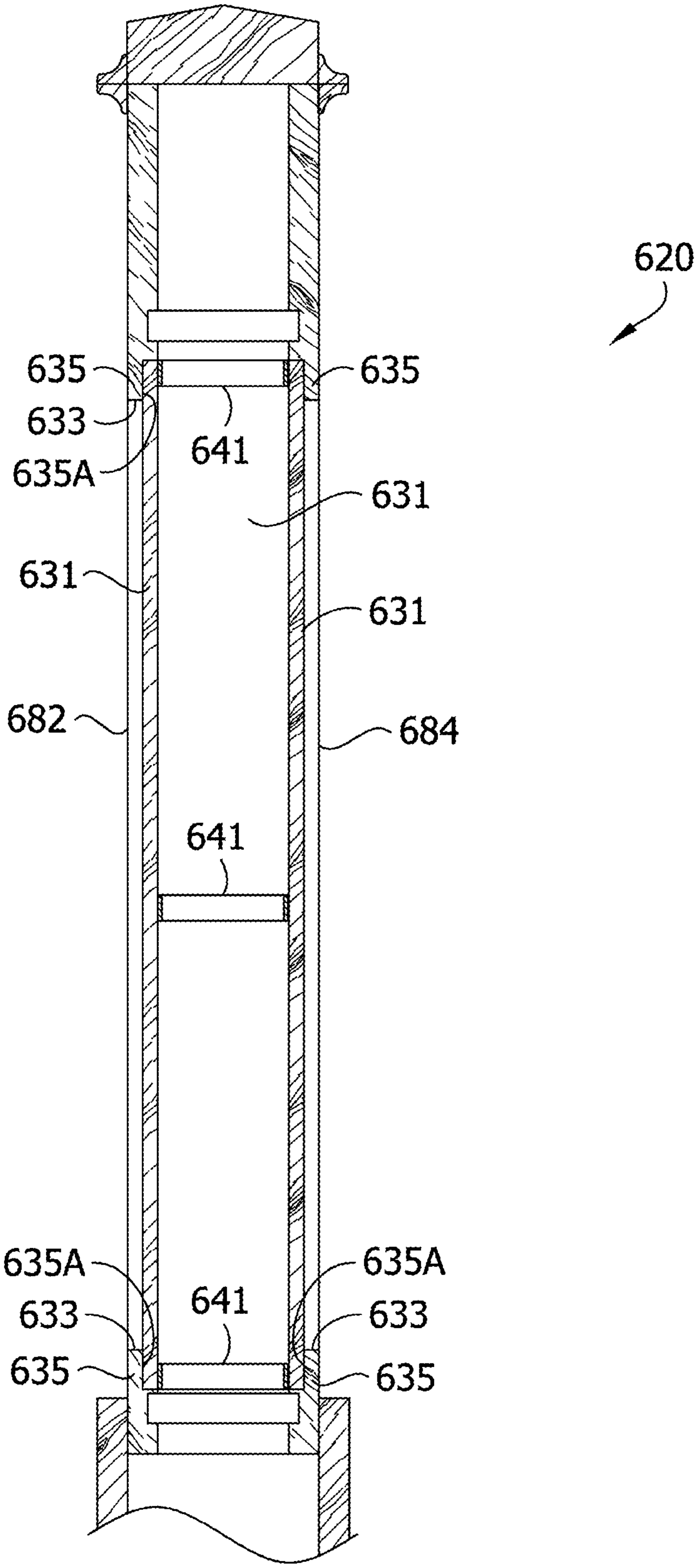
FIG. 29 is a section of the newel post taken in a plane including line 29-29 of FIG. 24.

Referring to FIG. 29, it will be appreciated that the upper and lower retainers 641 are located to be in registration with the lips 635 and vertically offset from or out of vertical registration with the openings 633. If glass panels 631 or panels of another transparent or translucent material are used, such positioning of the retainers 641 may be desirable to hide the retainers from view through the panels from outside the newel post 620. In such a case, the intermediate retainer 641 between the upper and lower retainers could be omitted.

Figure 30A:
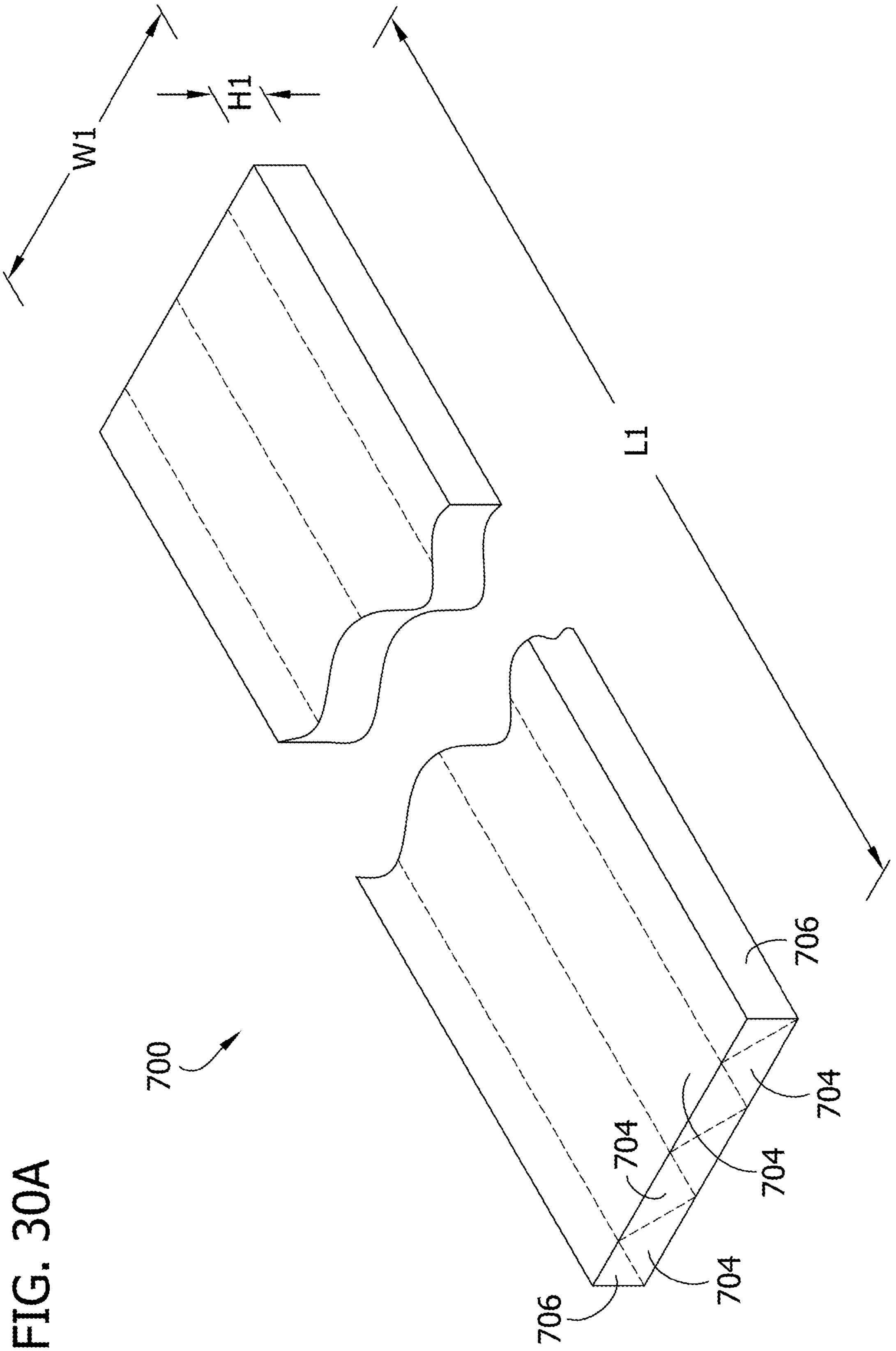
FIG. 30A is a fragmentary perspective of a first board of the present disclosure.
Figure 30B:
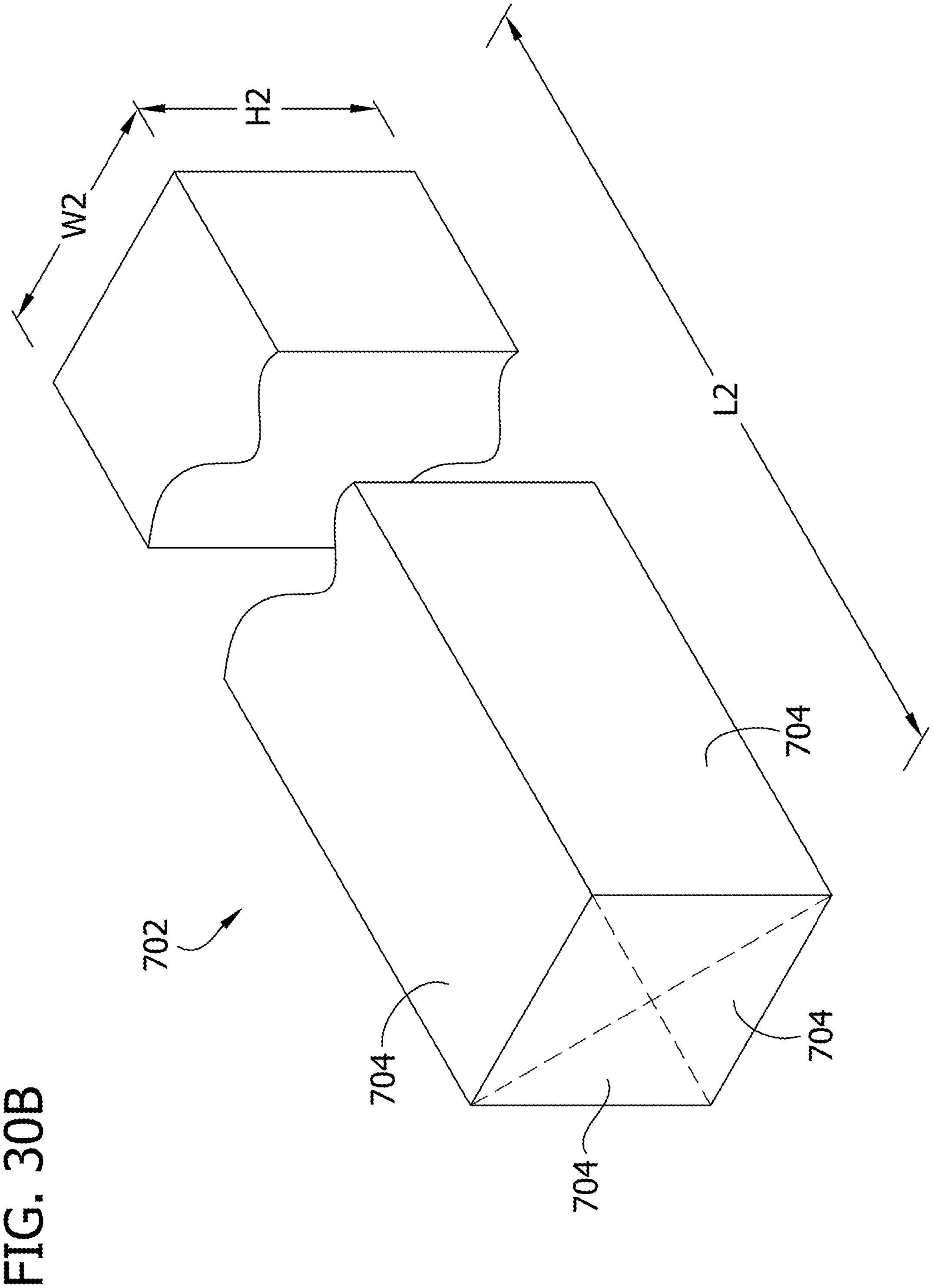
FIG. 30B is a fragmentary perspective of a second board of the present disclosure.
Figure 31:
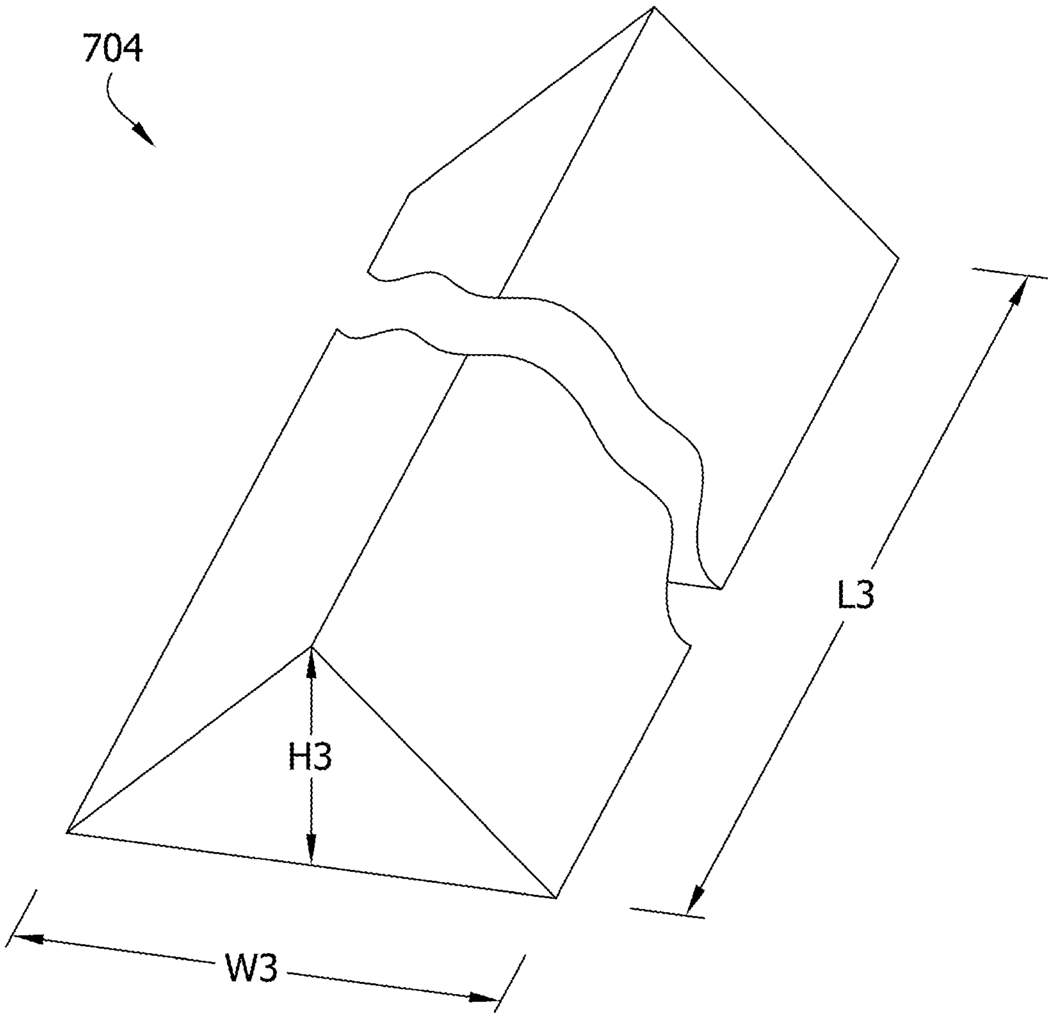
FIG. 31 is a fragmentary disclosure of a wood member cut from a board such as the first board of FIG. 30A or the second board of FIG. 30B.
Figure 32:
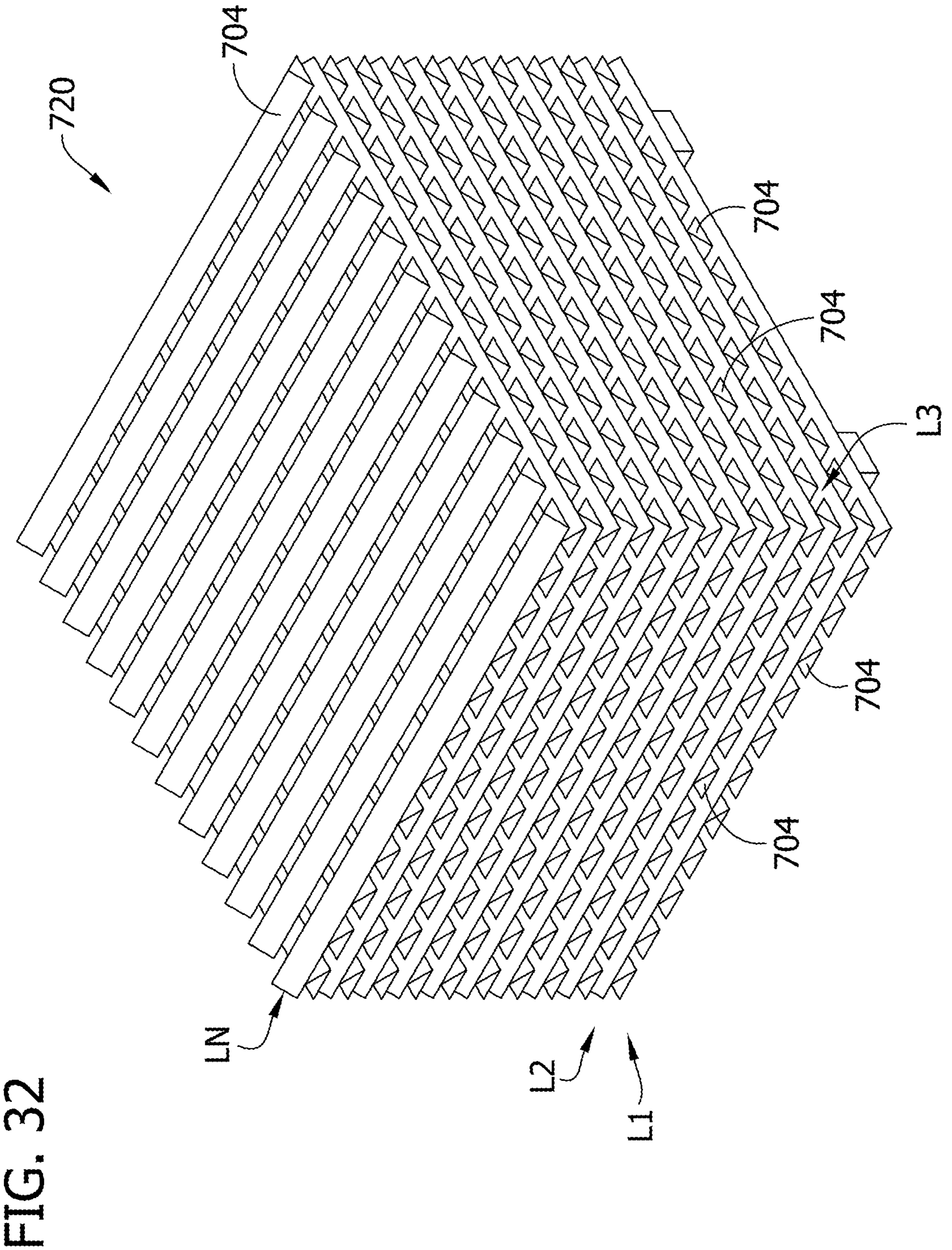
FIG. 32 is a perspective of a stack of wood members of the type shown in FIG. 31.

Another aspect of the present disclosure will now be described with reference to FIGS. 30-32. FIGS. 30A and 30B show boards 700, 702 (e.g., "raw material") from which wood members 704 can be cut to form components of the railing systems described above. The board 700 shown in FIG. 30A is rectangular in cross section, and the board 702 shown in FIG. 30B is square (broadly "rectangular") in cross section. Each board 700, 702 has a length L1, L2, width W1, W2, and height H1, H2, respectively. Cut regions where the boards can be cut to form multiple wood members 704 having a generally triangular cross section are indicated by broken lines. The board 700 of FIG. 30A could be cut at angles along the broken lines extending along the length of the board to form five triangular section wood members 704 and two end pieces of off-fall 706. The board 702 of FIG. 30B could be cut at angles along the length of the board to form four wood members 704 with no off fall. In one example, the board 700 of FIG. 30A is 6 feet long, 13.5 inches wide, and 2.25 tall. In another example, the board 702 of FIG. 30B is 6 feet long, 4.5 inches wide, and 2.25 inches tall. As shown in FIG. 31, a wood member 704 formed by cutting the boards 700, 702 as indicated can have a length L3 (e.g., 6 feet long), width W3 (e.g., 4.5 inches wide), and a height H3 (e.g., 2.25 inches tall). It will be appreciated that other sizes and shapes of boards and resulting wood members cut from the boards can be used without departing from the scope of the present disclosure. Moreover, it will be appreciated that the generally triangular shape of the cross section of the wood member 704 can deviate from a perfect triangle (e.g., have one or more indentations or rounded or truncated corners) without departing from the scope of the present invention.

In one method of preparing the wood members 704, the boards 700, 702 are "wet" in that they have not yet been dried. Cutting the boards 700, 702 to form the generally triangular section wood members 704 facilitates a process of drying the wood. For example, a plurality of boards 700 or 702 can be cut to form a plurality of the wood members 704, and the wood members could be stacked in an arrangement such as shown in FIG. 32. A bottom layer L1 of the stack 720 is formed by arranging several of the wood members 704 side-by-side in common orientations, with flat sides of the wood members facing downward. The arrangement is such that elongate edges of the wood members 704 are exposed at an upper side of the layer L1. The first layer L1 can be followed with a second layer L2 of wood members stacked on top of the first layer in an arrangement in which the wood members 704 of the second layer are generally transverse or lie across the wood members of the first layer. The downward facing generally flat surfaces of the wood members 704 of the second layer L2 rest on the upper elongate edges of the wood members of the first layer L1. The second layer L2 can be followed with a third layer L3 of wood members 704 stacked on top of the second layer in an arrangement in which the wood members 704 of the third layer are generally transverse or lie across the wood members of the second layer (generally parallel with the wood members of the first layer). Successive layers of wood members L1 to LN layers (e.g., 5-50 layers) could be arranged to form the stack to have an overall height of two feet to ten or more feet. Desirably, the side edges of the wood members 704 of a particular layer L1-LN are spaced laterally from each other. The stack of wood members 704 provides a particularly efficient arrangement for drying the wood members. The generally triangular cross-sectional shape of the wood members 704 decreases the drying time of the wood compared to a rectangular shape. In addition, because of the upper elongate edges of the wood members 704, there is minimal contact surface area between wood members of adjacent upper and lower layers. Accordingly, major surfaces of the wood members 704 are exposed or free of substantial contact with other wood members, and contact of the wood members does not substantially impede drying of the wood. Spacers (not shown) between layers of wood may be omitted. The distance from the major outer surfaces to the core of the wood (e.g., the longitudinal center axis of the wood members) is less than if the wood were dried in the form of the parent boards from which the wood members were cut.

In a first drying step, the stack 720 of wood members 704 could be left to dry naturally (e.g., outside, perhaps under cover) or in controlled environment (e.g., warehouse). In a second drying step, the stack 720 of wood members could be moved to a kiln or oven to be actively dried. It is believed the shape of the wood members 704 and the arrangement of the stack 720 of wood members provides efficiency in drying the wood members compared to, for example, a stack of rectangular section boards all extending parallel to each other and including layers of the boards separated by spacers to space the boards of adjacent layers from each other.

The dried wood members 704 can be used to form components of the railing systems, such as a wall of any of the newel posts described above. For example, after drying, the wood members 704 can be sanded and further processed (e.g., moved through a moulder or router, etc.) to provide the wood members with the shape of a wall of a newel post described above.

It will be apparent that modifications and variations are possible without departing from the scope of the invention defined in the appended claims. For example, components of the hand rail system and/or box newel can have other configurations or be omitted without departing from the scope of the present invention.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of assembling a post, the method comprising:

obtaining a plurality of elongate wood members, each elongate wood member having first and second ends and a length extending therebetween, each elongate wood member including a top portion extending lengthwise of the wood member and a bottom portion extending lengthwise of the elongate wood member, each elongate wood member having a generally triangular cross-sectional shape and including a nose defined by the top portion and a bottom side defined by the bottom portion; and assembling a post including multiple of the elongate wood members, wherein the post has a length extending lengthwise of the multiple elongate wood members, the post comprises a first corner and two of the elongate wood members form a joint at the first corner of the post along the length of the post.

2. The method of claim 1, further comprising working the multiple elongate wood members with a moulder or router prior to assembling the post.

3. The method of claim 1, further comprising working the multiple elongate wood members to remove the top portion prior to assembling the post.

4. The method of claim 3, wherein the post comprises a bore extending the full length of the post.

5. The method of claim 1, further comprising turning the post on a lathe.

6. The method of claim 1, further comprising working each of the multiple elongate wood members to each have mating lock structure, and wherein assembling the post comprises mating the mating lock structure of each one of the multiple elongate wood members with mating lock structure of another one of the multiple elongate wood members to locate the multiple elongate wood members relative to each other as parts of the post.

7. The method of claim 1, wherein assembling the post comprises arranging the multiple elongate wood members to each form an outer side of the post.

8. The method of claim 1, wherein the generally triangular cross-sectional shape includes a first side extending downward away from the nose toward the bottom side, and a second side extending downward away from the nose toward the bottom side.

9. A method as set forth in claim 1, wherein obtaining the plurality of elongate wood members comprises obtaining the plurality of elongate wood members arranged in at least one stack of elongate wood members, the at least one stack comprising a first row of elongate wood members, each elongate wood member of the first row having the top portion oriented upward and the bottom portion oriented downward, the at least one stack comprising a second row of elongate wood members above the first row, each elongate wood member of the second row having the top portion oriented upward and the bottom portion oriented downward, each elongate wood member of the second row extending across multiple elongate wood members of the first row.

10. The method of claim 9, wherein each elongate wood member of the second row has the bottom portion in contact with top portion of the elongate wood members of the first row.

11. The method of claim 1, wherein the multiple elongate wood members comprises four of the elongate wood members, and wherein assembling the post includes assembling the four elongate wood members into the post.

12. The method of claim 11, wherein the post comprises a newel post.

13. The method of claim 11, further comprising working the four elongate wood members with a moulder or router prior to assembling the post.

14. The method of claim 11, further comprising working the four elongate wood members to remove the top portions of the four elongate wood members prior to assembling the post.

15. The method of claim 14, wherein the post comprises a bore extending the full length of the post.

16. The method of claim 11, further comprising turning the post on a lathe.

17. The method of claim 11, further comprising working each of the four elongate wood members to each have mating lock structure, and wherein assembling the post comprises mating the mating lock structure of each one of the four elongate wood members with mating lock structure of another one of the four elongate wood members to locate the multiple elongate wood members relative to each other as parts of the post.

18. The method of claim 11, wherein assembling the post comprises arranging the four elongate wood members such that each elongate wood member forms an outer side of the post and the post further comprises a second corner, a third corner and a fourth corner and two of the elongate wood members form a joint at each of the corners of the post along the length of the post.

19. The method of claim 11, wherein the generally triangular cross-sectional shape includes a first side extending downward away from the nose toward the bottom side, and a second side extending downward away from the nose toward the bottom side.

20. A method as set forth in claim 11, wherein obtaining the plurality of elongate wood members comprises obtaining the plurality of elongate wood members arranged in at least one stack of elongate wood members, the at least one stack comprising a first row of elongate wood members, each elongate wood member of the first row having the top portion oriented upward and the bottom portion oriented downward, the at least one stack comprising a second row of elongate wood members above the first row, each elongate wood member of the second row having the top portion oriented upward and the bottom portion oriented downward, each elongate wood member of the second row extending across multiple elongate wood members of the first row.

* * * * *